(12) United States Patent
Sekiguchi et al.

(10) Patent No.: US 7,170,568 B2
(45) Date of Patent: Jan. 30, 2007

(54) LIQUID CRYSTAL SHUTTER DEVICE FOR COLOR IMAGING ON PHOTOSENSITIVE MEDIUM

(75) Inventors: Kanetaka Sekiguchi, Sayama (JP); Sadao Masubuchi, Chofu (JP)

(73) Assignee: Citizen Watch Co., Ltd., Nishitokyo (JP)

( * ) Notice: Subject to any disclaimer, the term of this patent is extended or adjusted under 35 U.S.C. 154(b) by 111 days.

(21) Appl. No.: 10/490,485

(22) PCT Filed: Sep. 25, 2002

(86) PCT No.: PCT/JP02/09824

§ 371 (c)(1),
(2), (4) Date: Mar. 23, 2004

(87) PCT Pub. No.: WO03/026898

PCT Pub. Date: Mar. 4, 2003

(65) Prior Publication Data

US 2004/0201787 A1    Oct. 14, 2004

(30) Foreign Application Priority Data

Sep. 26, 2001   (JP)   ............................. 2001-292963

(51) Int. Cl.
  *G02F 1/13*     (2006.01)
  *G02F 1/1343*   (2006.01)

(52) U.S. Cl. ............................. 349/2; 349/3; 349/143; 349/145

(58) Field of Classification Search ..................... 349/2
    See application file for complete search history.

(56) References Cited

U.S. PATENT DOCUMENTS

| | | | |
|---|---|---|---|
| 4,783,149 A | | 11/1988 | Umeda et al. |
| 4,899,224 A | * | 2/1990 | Ooba et al. ................... 386/42 |
| 5,548,423 A | | 8/1996 | Natsunaga |
| 6,366,338 B1 | * | 4/2002 | Masubuchi et al. ........... 355/67 |
| 6,509,939 B1 | * | 1/2003 | Lee et al. ..................... 349/39 |
| 6,930,699 B2 | * | 8/2005 | Yamada et al. ............. 347/232 |

FOREIGN PATENT DOCUMENTS

| | | |
|---|---|---|
| JP | 62-83728 | 4/1987 |
| JP | 62-134624 | 6/1987 |
| JP | 64-28622 | 1/1989 |
| JP | 1-142533 | 6/1989 |
| JP | 5-241141 | 9/1993 |
| JP | 6-186581 | 7/1994 |
| JP | 11-202362 | 7/1999 |

* cited by examiner

*Primary Examiner*—Andrew Schechter
*Assistant Examiner*—Michael H. Caley
(74) *Attorney, Agent, or Firm*—Westerman, Hattori, Daniels & Adrian, LLP.

(57) ABSTRACT

A liquid crystal shutter device is provided with a liquid crystal cell including a first substrate (1), a second substrate (21), and liquid crystal sandwiched therebetween, pixel electrodes (11, 12) which are signal electrodes and lead-out electrodes (15) provided on the first substrate (1), counter electrodes which are common electrodes facing the pixel electrodes, provided on the second substrate (21), and a plurality of pixel rows (200, 300, 400) which are composed of pixels (2, 3, 4, etc.) formed by overlapped portions of the pixel electrodes and the counter electrodes, and the liquid crystal shutter device controls light applied to a photosensitive member continuously and relatively moving in a direction orthogonal to the pixel rows, in which the counter electrodes are provided separately for the respective pixel rows. Further, an RGB coupling electrode (46) for electrically connecting the counter electrodes of the respective pixel rows is preferably provided.

28 Claims, 29 Drawing Sheets

LIQUID CRYSTAL SHUTTER DEVICE FOR COLOR IMAGING ON PHOTOSENSITIVE MEDIUM

TECHNICAL FIELD

The invention relates to a liquid crystal shutter device which controls light transmittance by electric signals for each pixel, and more specifically, to a liquid crystal shutter device used in an optical printer which forms a color image on a photosensitive member continuously and relatively moving, by controlling light irradiation to the photosensitive member.

BACKGROUND TECHNOLOGY

In recent years, video printers for printing out such an image on a sheet as displayed on a display screen after digitalization are in widespread use. The printing methods of the video printers include thermal method, ink-jet method, laser-beams scanning method, liquid crystal shutter method, and so forth. Among others, the liquid crystal shutter method is closely watched in view of its suitability for downsizing and weight saving.

The liquid crystal shutter method is a method for forming the image on a photosensitive member continuously and relatively moving, by controlling light irradiation to the photosensitive member with the use of a liquid crystal shutter device which controls light transmittance for each of a plurality of pixels aligned in one or more line(s) by ON/OFF, that is, opening/closing, by applying or not applying voltages to a liquid crystal layer. A printer employing the method is referred to as an optical printer.

A printing method using such a liquid crystal shutter device for printing out the image on a photosensitive paper using full range of colors is disclosed for example in JP, S62-134624, A. This method is characterized in that the liquid crystal shutter device and a white light source are used, in which a turret with color filters of red, blue, and green thereon is rotated by a motor to thereby selectively irradiate light from the light source as lights of red, green, or blue to the photosensitive paper via the liquid crystal shutter device, so that a full-color image is formed on the photosensitive paper.

Also, in JP, H6-186581, A, a structure to be hereinafter described is presented as one structure of the liquid crystal shutter device, in which pixel rows corresponding to the respective three light colors are provided, where pixels composing the pixel rows are aligned in two lines for each color in a direction orthogonal to a moving direction of the photosensitive paper at same pitches as of a pixel size of the aligning direction, each pixel of one of the two lines and that in the other line being arranged misaligning with each other by one pixel size in respective aligning directions, and a lead-out electrode of each pixel being led out in the moving direction of the photosensitive paper through spaces between the pixels.

When configuring the optical printer using the liquid crystal shutter device described in the latter patent gazette, there is required no adjustment in timings to rotate color filters, to open/close the pixels in the liquid crystal shutter device, and to move the photosensitive paper, enabling to form an extremely precise image. It is also possible to form the image by the pixels of the other line even in the spaces between the pixels which are required for wirings, enabling to form a high-quality and streak-free image.

However, when adopting the structure of the liquid crystal shutter device described in the latter patent gazette, there has been a problem that the lead-out electrodes for the center pixel row, namely the pixel row arranged as a second color, are wired by detouring around perimeters of pixel electrodes of first or third color pixels arranged at outer sides, so that driving waveform for the second color pixels affects open/close of the first or third color pixels to thereby cause an orthogonal band-shaped image irregular with respect to the relative moving direction of the photosensitive paper.

Hence, the configuration and the problem of the conventional liquid crystal shutter device will be described using FIG. 28 to FIG. 30 and FIG. 7. FIG. 28 is a plan view showing a conventional liquid crystal shutter device, FIG. 29 is a plan view for illustrating wirings of electrodes in the liquid crystal shutter device shown in FIG. 28, FIG. 30 is a sectional view taken along line 30—30 in FIG. 29, and FIG. 7 is a graph for depicting characteristics of the liquid crystal shutter device. Note that the pixels shown in these drawings are quite larger than their actual sizes for convenience of illustration.

As shown in FIG. 28 to FIG. 30, this liquid crystal shutter device has a transparent first substrate 1 and a transparent second substrate 21 adhered with a given gap therebetween by a sealant 33, and the gap is filled with liquid crystal and sealed with the sealant 33 and a closing member 34 to thereby hold the liquid crystal between the substrates 1 and 21 as a liquid crystal layer 32. In the optical printer employing this liquid crystal shutter device, as light colors to be irradiated to a photoreceptor, three colors of red (R), green (G), and blue (B) are used, and pixel rows are arranged in the liquid crystal shutter device to correspond to respective colors, as shown in FIG. 28. A single pixel row at the center is denoted by G pixel row 300, and two rows of an R pixel row 200 and a B pixel row 400 are arranged at the outer sides thereof, the respective pixel rows being composed of a plurality of pixels aligned in two lines as mentioned before.

Focusing on the respective pixels, as shown in FIG. 29 and FIG. 30, as signal electrodes made from a transparent conductive film, there are arranged, on the first substrate 1, the pixel electrodes for forming: the first line pixels of the R pixel row 200, such as an R1*a* pixel 2, an R1*b* pixel 4 which is arranged apart from the R1*a* pixel 2 by one pixel size in the aligning direction, and the like; and the second line pixels of the R pixel row 200 such as an R2*a* pixel 3 and the like which are arranged apart a little from the first line pixels by misaligning with the first line pixels by one pixel size at the same pitches. In FIG. 29, a reference number 11 representatively denotes an R1*a* pixel electrode forming the R1*a* pixel 2, and only part of the pixels are shown in the drawing for convenience of illustrating.

Additionally, the R1*a* pixel electrode 11 for example connects with an R1*a* connecting electrode 16 via an R1*a* lead-out electrode 15 to thereby connect with a first driving integrated circuit (IC) 61 via the R1*a* connecting electrode 16, whereby it is possible to apply driving signals to the R1*a* pixel electrode 11 from the first driving IC 61. The same is equally true of the other pixel electrodes and whereby it is possible to apply driving signals from the first driving IC 61 to each pixel electrode. Besides, the first driving IC 61 is connected with a first FPC 63 via a not-shown anisotropic conductive film provided on the first substrate 1, and the first FPC 63 applies required signals from outside to the first driving IC 61.

Further, there are arranged the pixel electrodes for forming the first line pixels of the G pixel row 300 at a position apart from the second line of the R pixel row 200 farther than the space between the lines of the R pixel row 200. A G1*a* pixel electrode 13 for example for forming a G1*a* pixel 7 connects with a G1*a* connecting electrode 17 via a G1*a* lead-out electrode 18 to thereby connect with the first driving IC 61 via the G1*a* connecting electrode 17. The same is equally true of the other pixel electrodes, and their lead-out electrodes detour around the respective pixel electrodes which form the pixels of the R pixel row 200 and are led out through the spaces therebetween to the respective connecting electrodes so that the other pixel electrodes connect with the first driving IC 61 via the lead-out electrodes and the connecting electrodes.

Furthermore, there are arranged the pixel electrodes for forming the second line pixels of the G pixel row 300 such as a G2*a* pixel 8 and the like. Moreover, at a position apart therefrom in the same distance as of the R pixel row 200 second line and the G pixel row 300 first line, there are arranged the pixel electrodes for forming the first line pixels of the B pixel row 400 such as a B1*a* pixel 9 and the like, and the second line pixels of the B pixel row 400 such as a B2*a* pixel 10 and the like.

These pixel electrodes are arranged substantially symmetric with respect to the pixel electrodes for forming the first and second line pixels of the R pixel row 200 and the first line pixels of the G pixel row 300, and connect with a second driving IC 62 provided on the counter side of the first driving IC 61 via the lead-out electrodes led out orthogonally to the aligning direction of the pixel electrodes and the connecting electrodes. Also, here, the lead-out electrodes led out from the pixel electrodes for forming the second line pixels of the G pixel row 300 provided in the center side detour around the pixel electrodes for forming the pixels of the B pixel row 400 and pass through the spaces therebetween to thereby connect with the respective connecting electrodes. Similarly, the second driving IC 62 connects with a second FPC 64 via a not-shown anisotropic conductive film provided on the first substrate 1, so that the second FPC 64 applies required signals from outside to the second driving IC 62.

Meanwhile, as a common electrode made of a transparent conductive film, there is provided a counter electrode 28 on the liquid crystal layer 32 side surface of the second substrate 21. Inside the sealant 33, the counter electrode 28 is provided in a rectangular shape so as to face all pixel electrodes for forming the pixels of respective pixel rows to thereby connect with an RGB pad electrode 47 provided outside of the sealant 33.

With such pixel electrodes and counter electrode 28, this liquid crystal shutter device achieves a high contrast ratio, in which a static drive being one liquid crystal driving method for increasing the response speed of the liquid crystal layer 32 is performed.

Also, on the counter electrode 28, there is provided a black matrix (BM) 24 as a light shield film. The black matrix 24 is provided inside the sealant 33 and slightly inside the counter electrode 28 so as to directly border on the counter electrode 28. Accordingly, when using a conductive light shield film such as a metal film and the like for the black matrix 24, the counter electrode 28 and the black matrix 24 have the same electric potential. In the black matrix 24, there are still provided BM openings 29 in portions corresponding to the respective pixel electrodes provided on the first substrate 1, the BM opening 29 being smaller than the pixel electrode in area. The overlapped portion of the pixel electrode and the BM opening 29 forms the pixel where the amount of transmitted light is practically controlled.

Still, on the opposite side surface of the liquid crystal layer 32 of the first substrate 1, a first polarizer 71 is provided, and on the opposite side surface of the liquid crystal layer 32 of the second substrate 21, a second polarizer 73 is provided. The voltages applied to the liquid crystal layer 32 by the respective pixel electrodes and the counter electrode 28 are changed, and the transmitting state of light rays 75 transmitting through the pixel portions is controlled by the first polarizer 71, the second polarizer 73, and the liquid crystal layer 32, so that irradiated light amount to the not-shown photosensitive member is controlled.

In the conventional liquid crystal shutter device mentioned before, the counter electrode 28 is formed substantially all over the inside of the sealant 33 on the second substrate 21 without regard to the arrangement of pixel rows. Hence, not only the pixel electrodes but also the lead-out electrodes inevitably face the counter electrode, and therefore when applying voltages to between the respective pixel electrodes and the counter electrode 28, the voltages with the same electrical potentials are also applied to between the lead-out electrodes corresponding to the pixel electrodes and the counter electrode 28. As a result, driving signals to one pixel affect the voltages to be applied to the liquid crystal layer 32 at the other pixel via the counter electrode 28, and thus affect the transmittance of the other pixels in the end.

As with the example described above, when the three pixel rows are provided corresponding to the three colors of lights, the lead-out electrodes corresponding to the pixels of the inner side pixel row (here, G pixel row 300) are led out longer, so that their areas facing the counter electrode 28 become larger, besides, they are led out through near the pixel electrodes and the lead-out electrodes corresponding to the pixel rows of the outer sides (here, the R pixel row 200 and the B pixel row 400), so that the driving signals to the pixels of the inner side pixel row strongly affect the transmittance of the pixels of the outer side pixel rows.

In this regard, more detailed description will be provided. In the conventional liquid crystal shutter device mentioned above, a structure can be adopted in which, at 0th (level of) tone, a time period during which voltages having a larger absolute value is applied to the liquid crystal layer 32 is at the minimum and the transmittance is at the maximum, at 255th tone, the time period during which voltage having a larger absolute value is applied to the liquid crystal layer 32 is at the maximum and the transmittance is at the minimum, and 127th tone is seen as a medium. In such a structure, after fixing the signals to be applied for example to the R1*a* pixel 2 to 127 tones signals, if tones of the first line pixels of the G pixel row, of which lead-out electrodes are led out around the R pixel row side, are shifted from 127 tones states to 255 tones sequentially pixel by pixel, the transmittance gradually changes despite the voltages to be applied to the R1*a* pixel 2 are fixed. A curving line X in FIG. 7 shows this change.

In FIG. 7, the horizontal axis represents the number of first line pixels of the G pixel row which have been shifted from 127th tone to 255th tone, and the vertical axis represents the change in the transmittance at the focused R1*a* pixel 2. As shown in the graph, if such one G pixel as connected with the lead-out electrode provided between the R1*a* pixel 2 and the R1*b* pixel 4 in the first line is shifted from 127th tone to 255th tone, the transmittance in the focused R1*a* pixel 2 goes away from the target values. Similarly, if an adjacent G pixel of the same line is shifted from 127th tone to 255th tone, the transmittance at the focused R1*a* pixel 2 goes further away from the target values. When the number of the G pixels shifted from 127th tone to 255th tone is increased to 10, the transmittance at the focused R1*a* pixel 2 changes by about 3% from the initial transmittance at 127th tone. This means that the exposed amount at one pixel deviates from a target exposure amount by the same percentages, when the photoreceptor is exposed.

When the pixels of the G pixel row connected with the lead-out electrodes passing through the vicinity of the other pixels of the R pixel row are shifted in tone, the transmittance of the pixels of the R pixel row similarly deviates from the target values. These deviations appear as a band-shaped image irregular on a printed paper. Such a problem occurs also between the second color pixels (G pixels) and the third color pixels (B pixels), resulting in the similar band-shaped image irregular.

This band-shaped image irregular is specifically distinct when the pixels of respective colors are away from each other, and the image irregular still remains when they are close to each other, even though it is indistinctive. Besides, when the pixels of respective colors are closely provided, it is still difficult to separate colors, and optical system becomes complicated. Specifically, when increasing light amount, a light source becomes larger, and thus it is difficult to provide them closely.

In its essence, in the conventional liquid crystal shutter device as shown in FIG. 28 to FIG. 30, there is such a problem that the pixels of the two outer side rows are largely affected on their light transmittance when signals are applied to the center row pixels.

Should the liquid crystal shutter device of a matrix type be employed here, the above-described influence on the image irregular can be lessened, while response speed and contrast ratio also fall to thereby cause printing time increase and image quality down. In addition, it is required to closely provide the light sources of the respective colors, so that light interference and color mixture occur. Even though the light sources are turned on in sequence for preventing color mixture, printing time and the light amount volatility of the light sources increase as compared to the case where the light sources are turned on simultaneously for printing, since the lights are turned on for example in the order of red, green, and blue in a time-shared manner.

It is an object of the invention to bring solutions to such a problem and make the liquid crystal shutter device provided with a plurality of pixel rows capable of controlling light transmittance of the pixels composing the pixel rows to a desired value and controlling light irradiation to the photosensitive member appropriately, so that a high quality of image without image irregular can be formed.

DISCLOSURE OF THE INVENTION

In order to attain the previously-described object, the invention is made as a liquid crystal shutter device which includes a liquid crystal cell having a first substrate, a second substrate and liquid crystal sandwiched therebetween, pixel electrodes being signal electrodes and lead-out electrodes provided on the first substrate, counter electrodes being common electrodes facing the pixel electrodes, provided on the second substrate, and a plurality of pixel rows comprising pixels each formed by an overlapped portion of the pixel electrode and the counter electrode, the liquid crystal shutter device controlling light irradiation to a photosensitive member continuously and relatively moving in a direction orthogonal to the pixel rows, in which the counter electrodes are separately provided for each of the pixel rows.

In such a liquid crystal shutter device, preferably, there is further provided a connector for electrically connecting the counter electrodes for each of the pixel rows, in which, preferably, the connector is provided outside of a liquid crystal shutter function portion in which the pixel rows are arranged.

Further, the counter electrodes preferably include pixel counter electrodes each corresponding to each of the pixel electrode and common connecting electrodes for electrically connecting the pixel counter electrodes. Furthermore, the common connecting electrodes preferably include lacing electrodes provided alongside the pixel rows and take-out electrodes for connecting the pixel counter electrodes and the lacing electrodes, in which preferably the pixel counter electrode is formed in an almost same shape as of the pixel electrode.

Moreover, the pixels composing the pixel rows are preferably aligned in two lines for each pixel row at same pitches as of a pixel size is an aligning direction, the pixels of one of the two lines and the pixels of the other line being arranged at positions misaligning with each other by one pixel size in respective aligning directions.

In another case, the pixels composing the pixel rows are preferably aligned in two lines for each pixel row at same pitches as of a pixel size is an aligning direction, the pixels of one of the two lines and the pixels of the other line being arranged at positions misaligning with each other by one pixel size in respective aligning directions, in which preferably each of the counter electrodes is provided in an one-band shape for the pixel electrodes composing the pixels aligned in two lines.

In still another case, each of the counter electrodes are preferably provided in a band shape for the pixel electrodes composing the pixels aligned in two lines, separately for each line.

Also, in the above-described liquid crystal shutter device, preferably, the common connecting electrode includes a lacing electrode provided alongside the pixel rows and a take-out electrode for connecting the pixel counter electrodes and the lacing electrodes, and the lacing electrodes are provided on both sides of the pixel counter electrodes aligned in two lines and the take-out electrodes taken out from the pixel counter electrodes aligned in two lines are connected with the lacing electrode on corresponding side, respectively.

In another case, the lacing electrodes are preferably provided on one side of the pixel counter electrodes aligned in two lines, and the take-out electrodes connect in common respective pair of pixel counter electrodes composing the pixel counter electrodes aligned in two lines and also connect the pair of pixel counter electrodes with the lacing electrodes.

Further, in these liquid crystal shutter devices, in an overlapped portion of the lead-out electrode and the lacing electrode, preferably, either of the lead-out electrode or the lacing electrode is made small in line width as compared to the remaining portions thereof.

Alternatively, in the above-described liquid crystal shutter device, preferably, three pixel rows are provided as the plurality of pixel rows in which, preferably, the three pixel rows correspond to respective colors of red (R), green (G), and blue (B), in which, preferably, in outside two pixel rows out of the three pixel rows, the counter electrode includes pixel counter electrodes each corresponding to each of the pixel electrodes and common connecting electrodes for electrically connecting the pixel counter electrodes, and in a center pixel row, the counter electrode is formed in a band shape so as to face the pixel electrodes of corresponding pixel row.

Moreover, in the above-described liquid crystal shutter device, preferably, there is further provided a metal-plated layer for portions of the counter electrodes except those portions facing the pixel electrodes.

In another case, preferably, a metallic light shield film is provided on the second substrate with an insulating film therebetween, in which, preferably, the light shield film is provided separately for each of the pixel rows. In still another case, preferably, there is provided a light shield film connector for electrically connecting the light shield films separately provided for each of the pixel rows.

In these liquid crystal shutter devices, preferably, a pad electrode is further provided on the second substrate for supplying the light shield films with electric signals, preferably, a connecting electrode facing the pad electrode via the insulating film is still further provided on the second substrate, in which, preferably, a conductive area is formed in the insulating film between the pad electrode and the connecting electrode, and preferably, there is further provided a light shield film driving circuit for supplying the connecting electrode with light shield film driving signal, the light shield film driving circuit supplying the pad electrode with the light shield film driving signal from the connecting electrode via the conductive area.

Preferably, there is provided a light shield film driving circuit for supplying the connecting electrode with light shield film driving signal, preferably, the light shield film driving circuit supplying the pad electrode with an AC light shield film driving signal from the connecting electrode via the insulating film.

In these cases, preferably, the light shield film driving signal has a medium voltage of a voltage range being applied to the liquid crystal by the pixel electrodes and the counter electrodes or a center voltage of the light shield film driving signal is the medium voltage.

Preferably, there is provided an external light shield member on a side of the first substrate or the second substrate opposite to the liquid crystal.

In the above-described liquid crystal shutter devices, the counter electrodes are provided separately for respective pixel rows, enabling to reduce the facing areas of the counter electrodes and the lead-out electrodes. Accordingly, it is possible to lower the effect of voltages applied to between the counter electrodes being common electrodes and the lead-out electrodes. As a result, it is possible to lower such an effect as caused by the driving signals applied to one pixel and affecting the other pixels in view of transmittance. Additionally, for example, when the pixel counter electrodes and the common connecting electrodes are provided as the counter electrodes, and/or the lacing electrodes and the take-out electrodes are provided as the common connecting electrodes, further effectiveness can be obtained.

BEST MODE FOR CARRYING OUT THE INVENTION

With the purpose of detailing the invention, some embodiments of the invention will be described in conjunction with the accompanying drawings.

First Embodiment: FIG. 1 to FIG. 7

Figure 1:
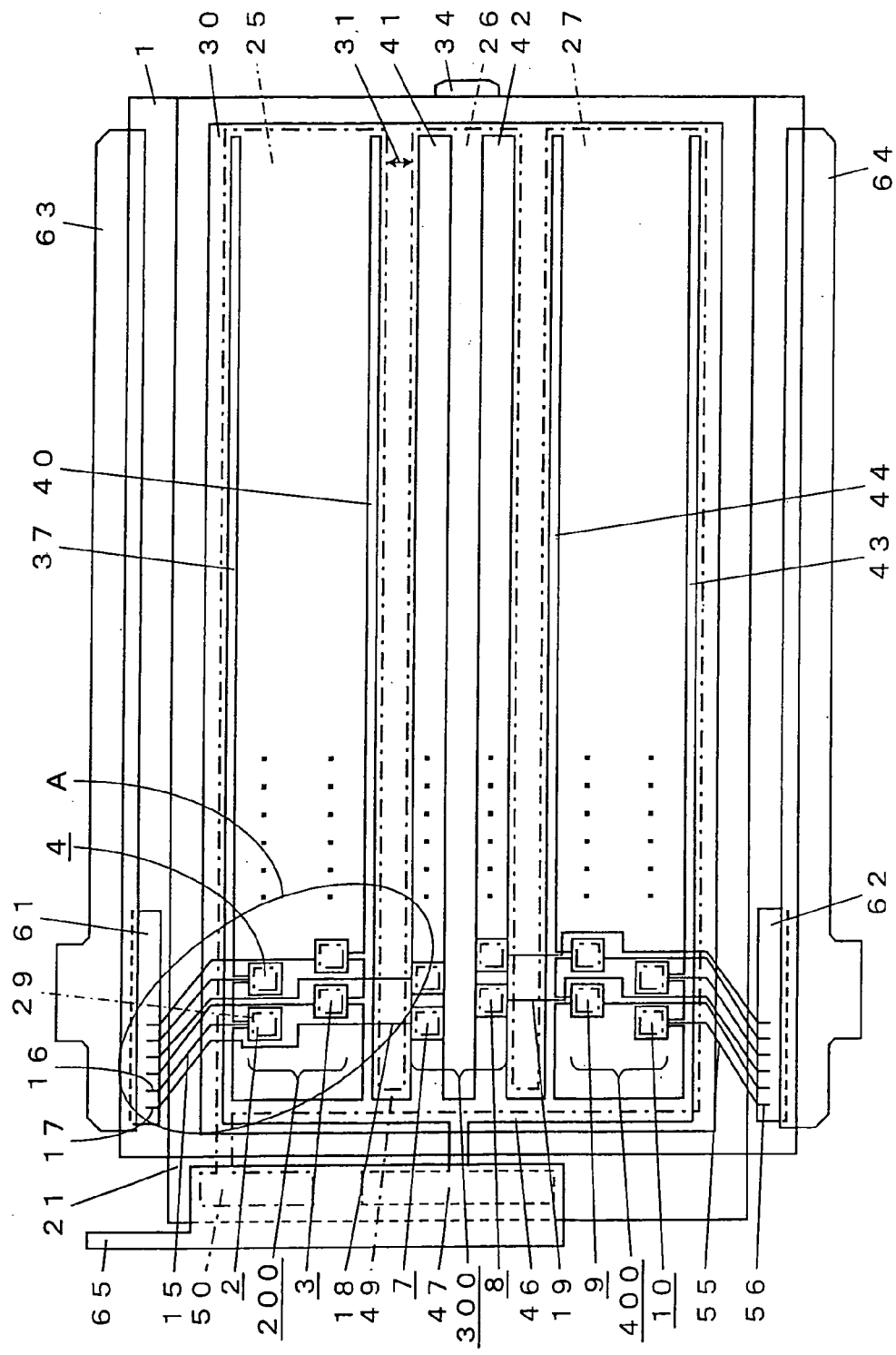
FIG. 1 is a plan view for illustrating an arrangement of electrodes and light shield films in a liquid crystal shutter device according to a first embodiment of the invention.
Figure 2:
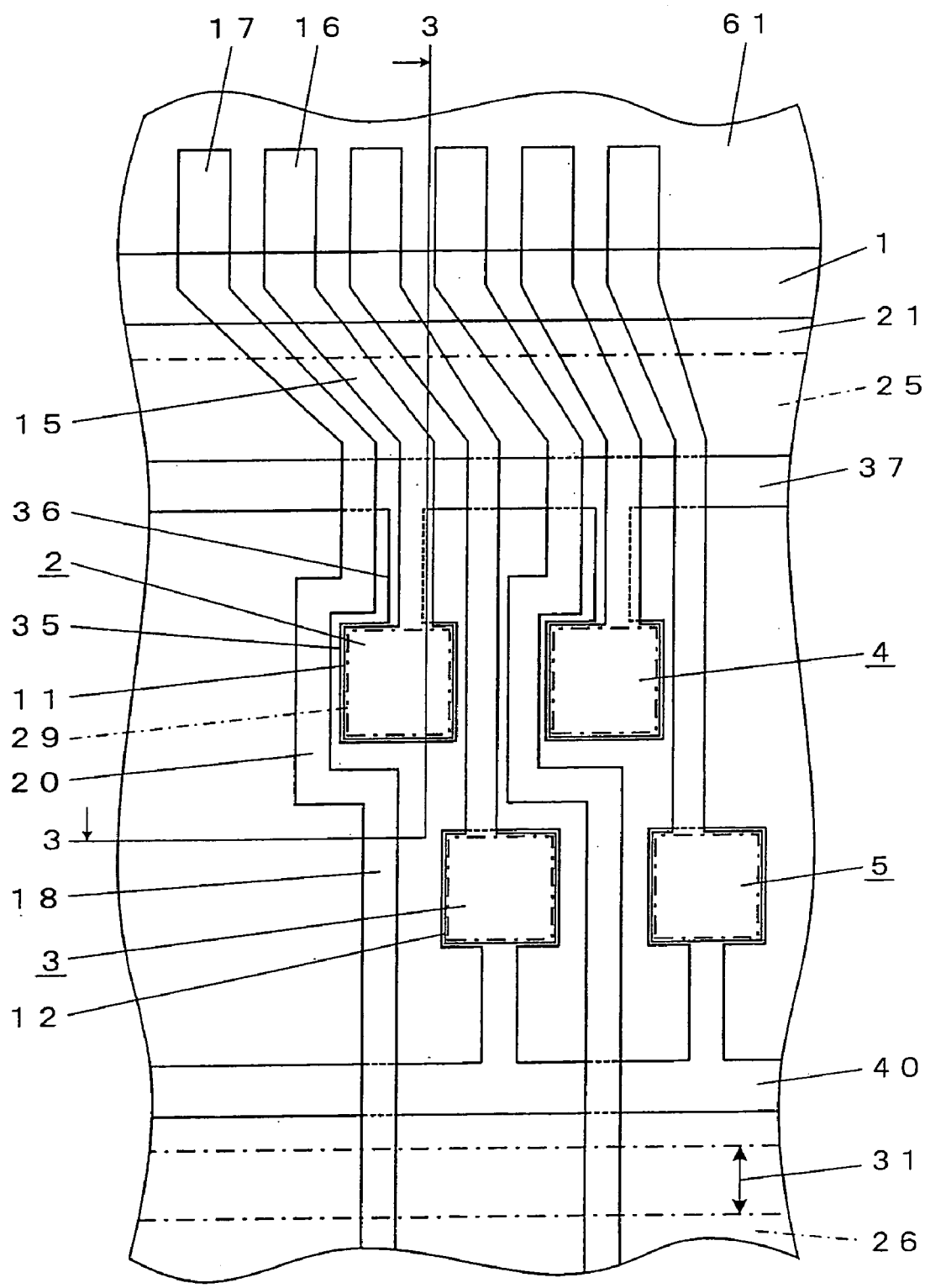
FIG. 2 is a partial plan view partially showing inside of an oval A in FIG. 1 by enlarging the same.
Figure 3:
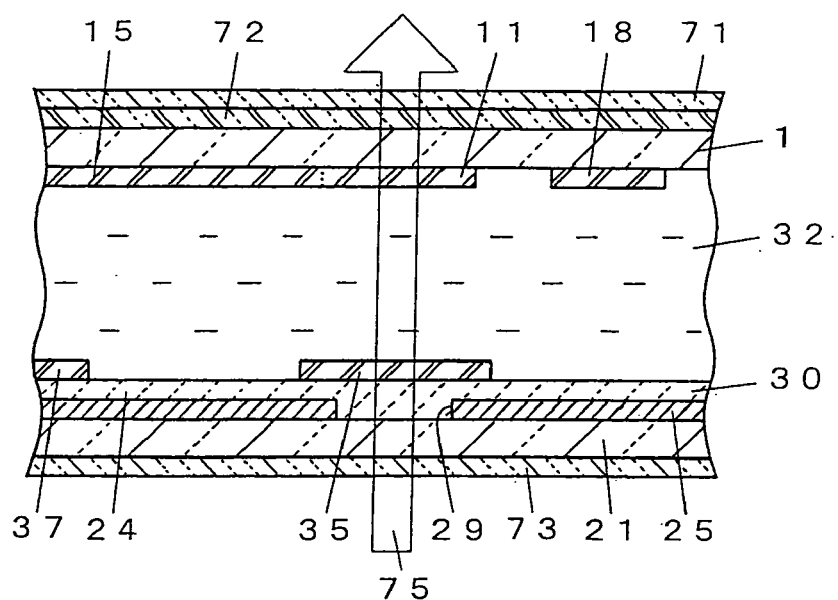
FIG. 3 is a partial sectional view showing part of the section taken along line 3—3 in FIG. 2.
Figure 4:
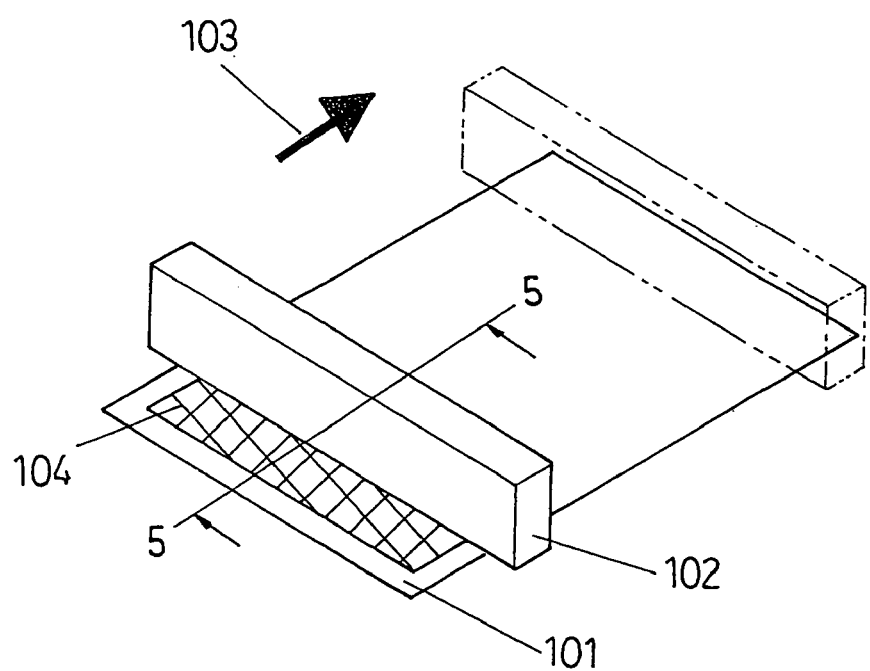
FIG. 4 is a schematic view for illustrating an operation of an optical printer provided with the liquid crystal shutter device shown in FIG. 1.
Figure 5:
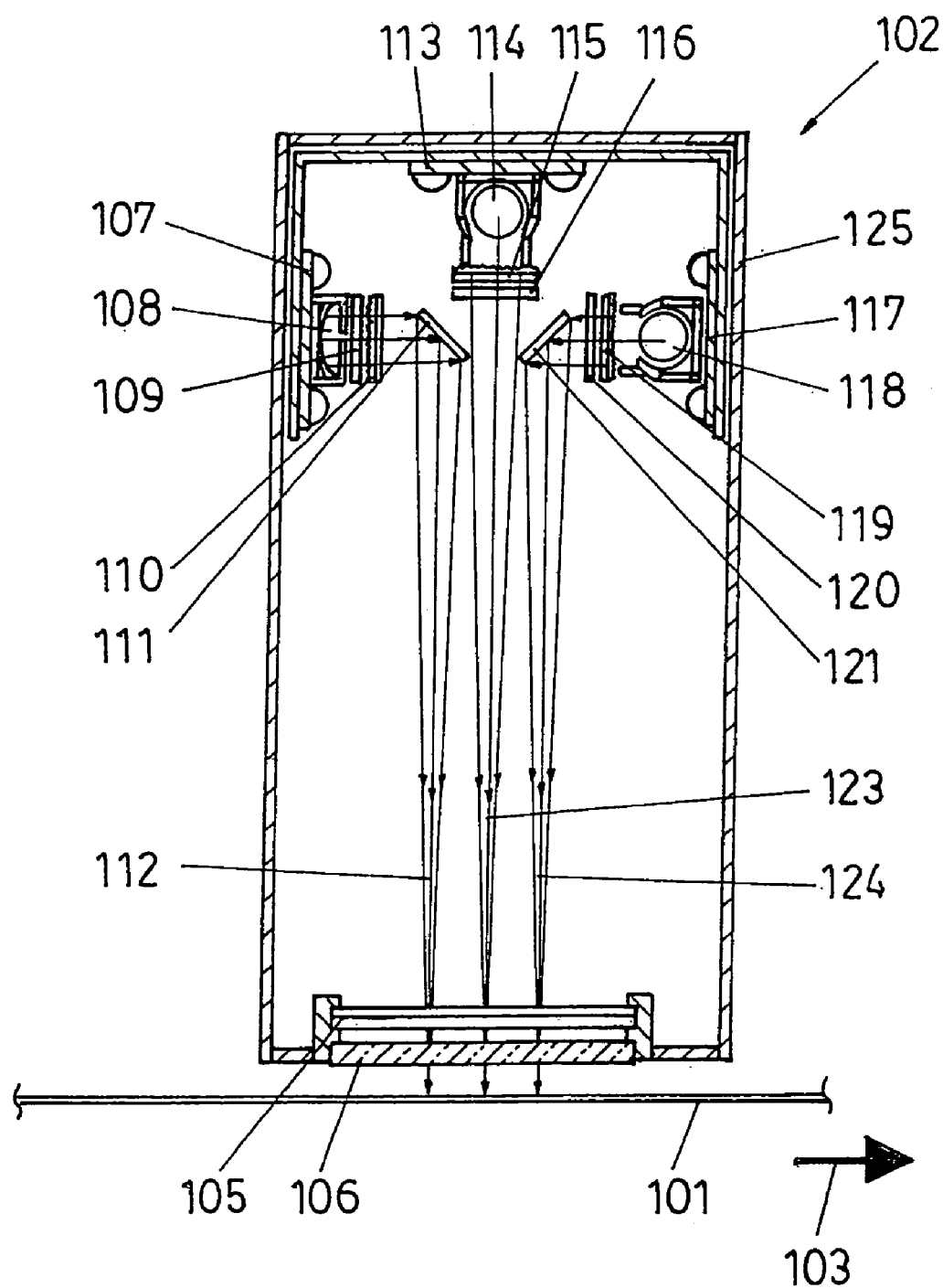
FIG. 5 is a schematic sectional view taken along line 5—5 in FIG. 4.
Figure 6:
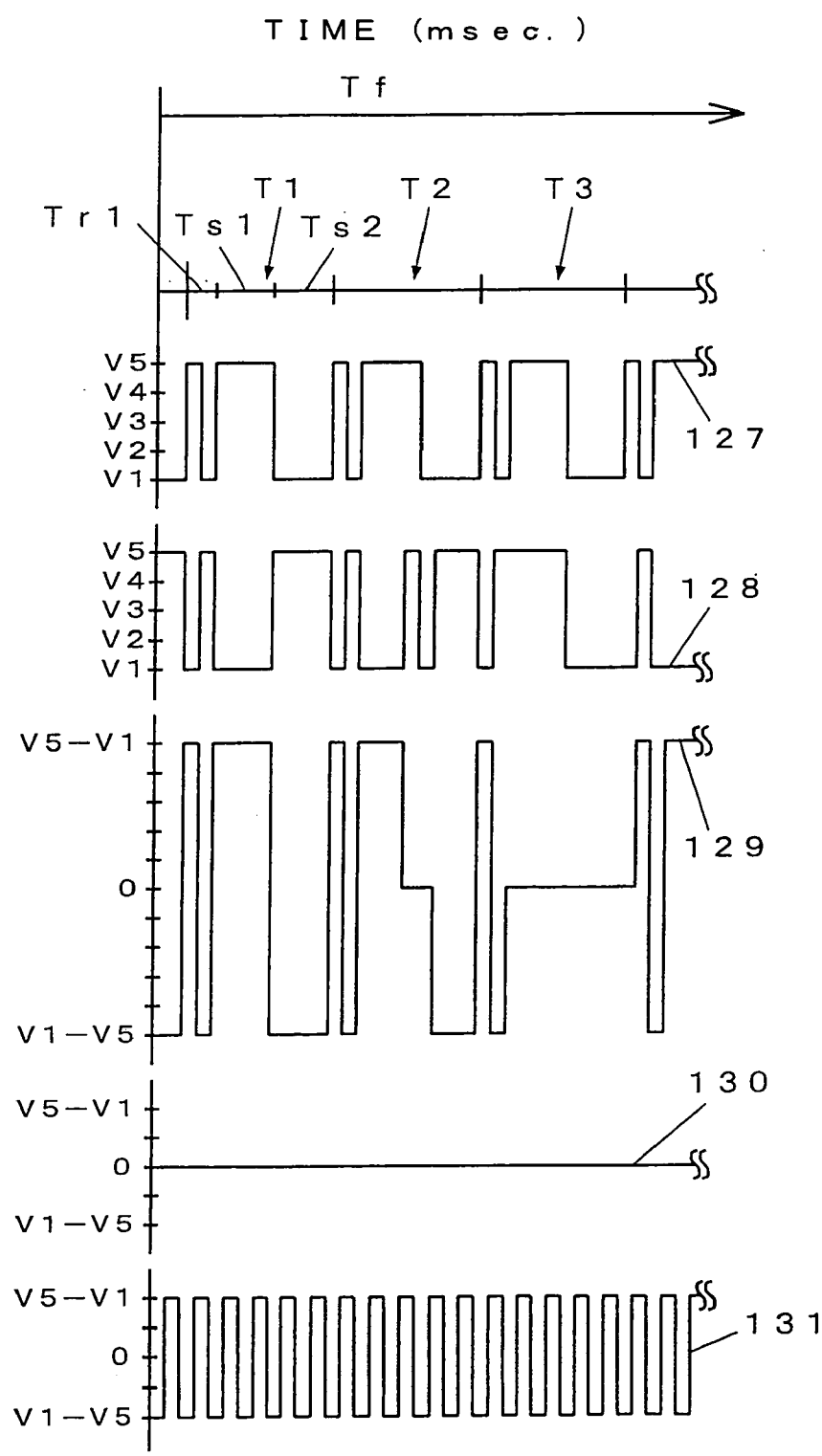
FIG. 6 is a view showing driving signals for driving the liquid crystal shutter device shown in FIG. 1.
Figure 7:
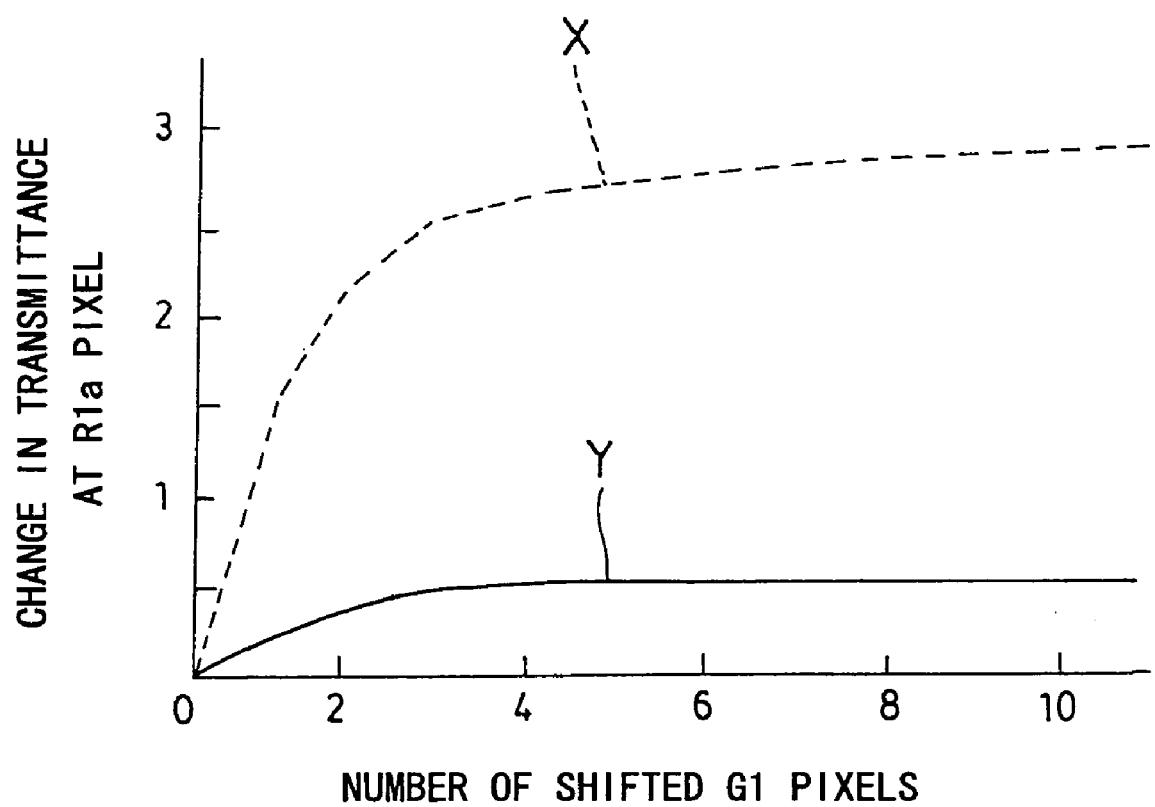
FIG. 7 is a graph for depicting characteristics of the liquid crystal shutter device and a conventional liquid crystal shutter device.

First, a first embodiment of a liquid crystal shutter device of the invention and an optical printer provided with the liquid crystal shutter device will be described. FIG. 1 is a plan view for illustrating an arrangement of electrodes and light shield films in the liquid crystal shutter device, FIG. 2 is a partial plan view partially showing inside of an oval A in FIG. 1 by enlarging the same, FIG. 3 is a partial sectional view showing a part of the section taken along line 3—3 in FIG. 2, FIG. 4 is a schematic view for illustrating an operation of the optical printer, FIG. 5 is a schematic sectional view taken along line 5—5 in FIG. 4, FIG. 6 is a diagram showing driving signals for driving the liquid crystal shutter device shown in FIG. 1, and FIG. 7 is a graph for depicting characteristics of the liquid crystal shutter device. Note that pixels shown in these drawings are quite larger than their actual sizes for convenience of illustration. In addition, for portions corresponding to the portions shown in FIG. 28 to FIG. 30 referred to in BACKGROUND TECHNOLOGY, the same reference numbers are used in these drawings.

The optical printer employing the liquid crystal shutter device according to the embodiment is, as shown in FIG. 4, a device to form an image 104 to a surface of a photosensitive paper 101 being a photosensitive member by exposing the photosensitive paper 101 while moving a liquid crystal shutter array 102 being an aligner provided with the liquid crystal shutter device in a moving direction 103 relatively to the photosensitive paper 101. At this point, the above-mentioned relative movement may be performed by moving the photosensitive paper 101 or by moving the liquid crystal shutter array 102. In a physical optical printer, there are provided a supporting member for supporting the liquid crystal shutter array 102 and a mechanism for performing the relative movement, yet, illustrations thereof are omitted here.

In the liquid crystal shutter array 102, as shown in FIG. 5, respective light source substrates for R, G, B are mounted on upper inside portions of an outer housing 125 such that their mounted positions are adjustable, respectively. Of these an R substrate 107 being a first mounting substrate is mounted on one side surface, a G substrate 113 being a second mounting substrate is mounted on an upper undersurface, and a B substrate 117 being a third mounting substrate is mounted on the other side surface, respectively.

On the R substrate 107, there are fixed a plurality of first light emitter aligned in an orthogonal direction to the moving direction 103 of the liquid crystal shutter array 102, each of which comprises of an R light emitting element 108 being an LED, an R scattering member 109, and an R lens member 110. On the G substrate 113, there is fixed a second light emitter comprising a white light lamp for G 114 for emitting white light, a G lens member 115, and a G color filter 116, which is formed lengthwise in the orthogonal direction to the moving direction 103. And, on the B substrate 117, there is fixed a third light emitter comprising a white light lamp for B 118 for emitting white light, a B lens member 119, and a B color filter 120, formed lengthwise in the orthogonal direction to the moving direction 103. These first, second, and third light emitter compose a light source of the liquid crystal shutter array 102.

Further, in front of the R lens member 110, there is disposed an R reflecting member 111 for reflecting an R light ray 112 being a first color light emitted by the first light emitter toward the photosensitive paper 101, in front of the B lens member 119, there is disposed a B reflecting member 121 for reflecting a B light ray 124 being a third color light emitted by the third light emitter toward the same photosensitive paper 101, and a G light ray 123 being a second color light emitted by the second light emitter is condensed to an adequate irradiation spot by the G lens member 115.

Meanwhile, in the lower inside portion of the outer housing 125, there are mounted a liquid crystal shutter 105 being an optical shutter for controlling light transmittance by electric signals, and a lens array 106 for condensing the light passed through the liquid crystal shutter 105 so that the light is focused on the photosensitive paper 101.

While moving a top surface of the photosensitive paper 101 relatively to such a liquid crystal shutter array 102 as described above, the respective light emitter emit lights to expose the photosensitive paper 101 while controlling irradiation of respective color lights irradiated from the light emitter by adequately transmitting or shielding them by the liquid crystal shutter 105, so that the image 104 can be printed out on the top surface of the photosensitive paper 101.

The liquid crystal shutter 105 used in such an optical printer is the liquid crystal shutter device of the invention. Its general configuration and arrangement of pixels are the same as those described in BACKGROUND TECHNOLOGY using FIG. 28, that is, there are provided a transparent first substrate 1 and a transparent second substrate 21 adhered by a sealant 33 with a given gap therebetween, and a liquid crystal layer 32 filling the gap and sandwiched between the substrates. It is notable that the sealant 33 is omitted to illustrate in FIG. 1 to FIG. 7 used for the description of the first embodiment, whereas, it is also provided here as in the conventional device shown in FIG. 28 and FIG. 29.

Further, there are provided three pixel rows of an R pixel row 200, a G pixel row 300, and a B pixel row 400 corresponding to the three colors of lights to be irradiated. The pixels composing the respective pixel rows are aligned in two lines at the same pitches as of the pixel size in the aligning direction thereof, and those pixels of one of the two lines and those pixels of the other line are arranged at positions misaligning with each other by one pixel size in respective aligning directions.

Such a pixel arrangement enables to lead out the lead-out electrodes of the pixels of different lines or different pixel rows through spaces between the pixels of respective lines. Moreover, when spaces between the pixel rows are made larger than a space between the lines of one pixel row, light separation in the case where different colors of lights are irradiated to each pixel row is facilitated.

Figure 28:
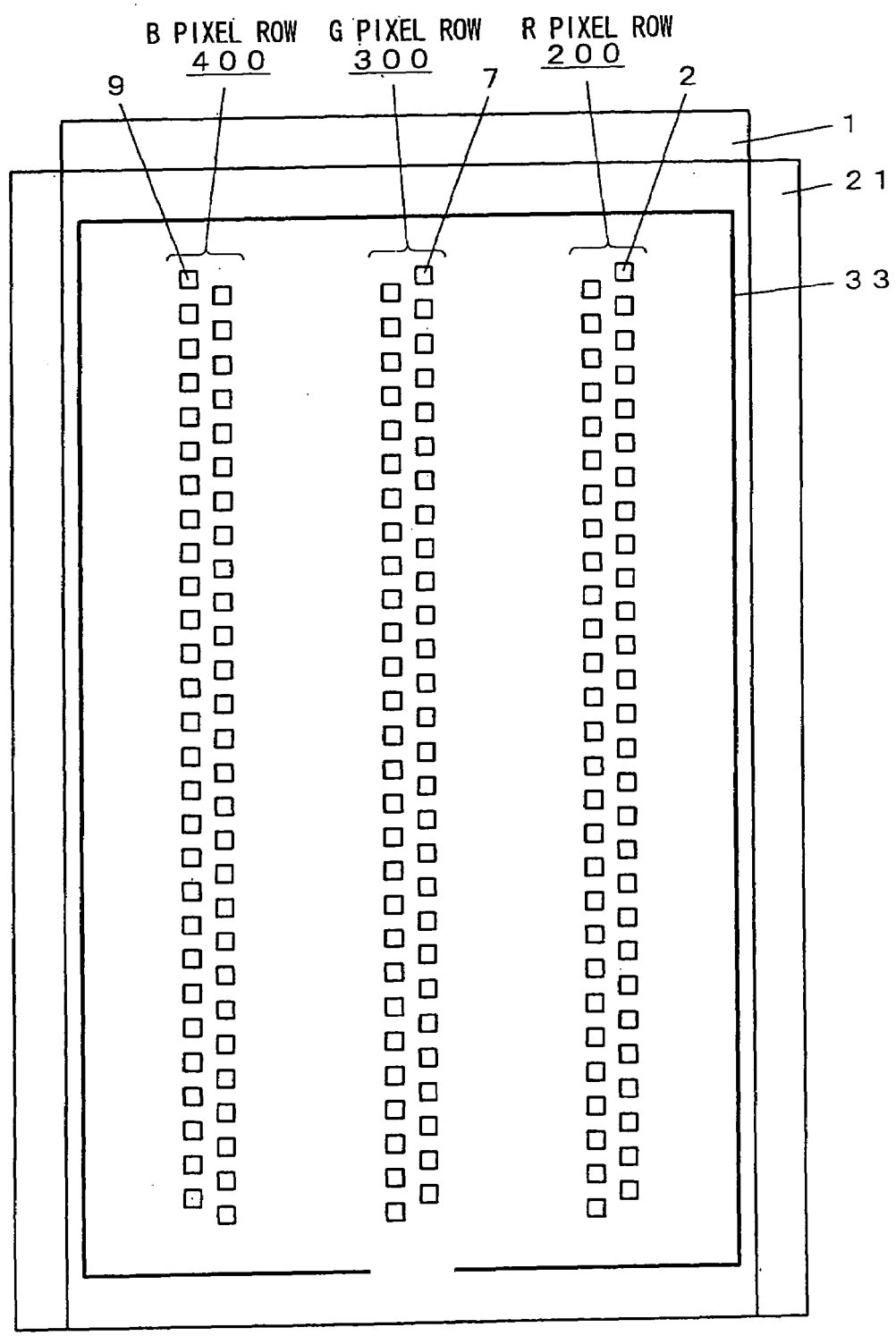
FIG. 28 is a plan view of a conventional liquid crystal shutter device.
Figure 29:
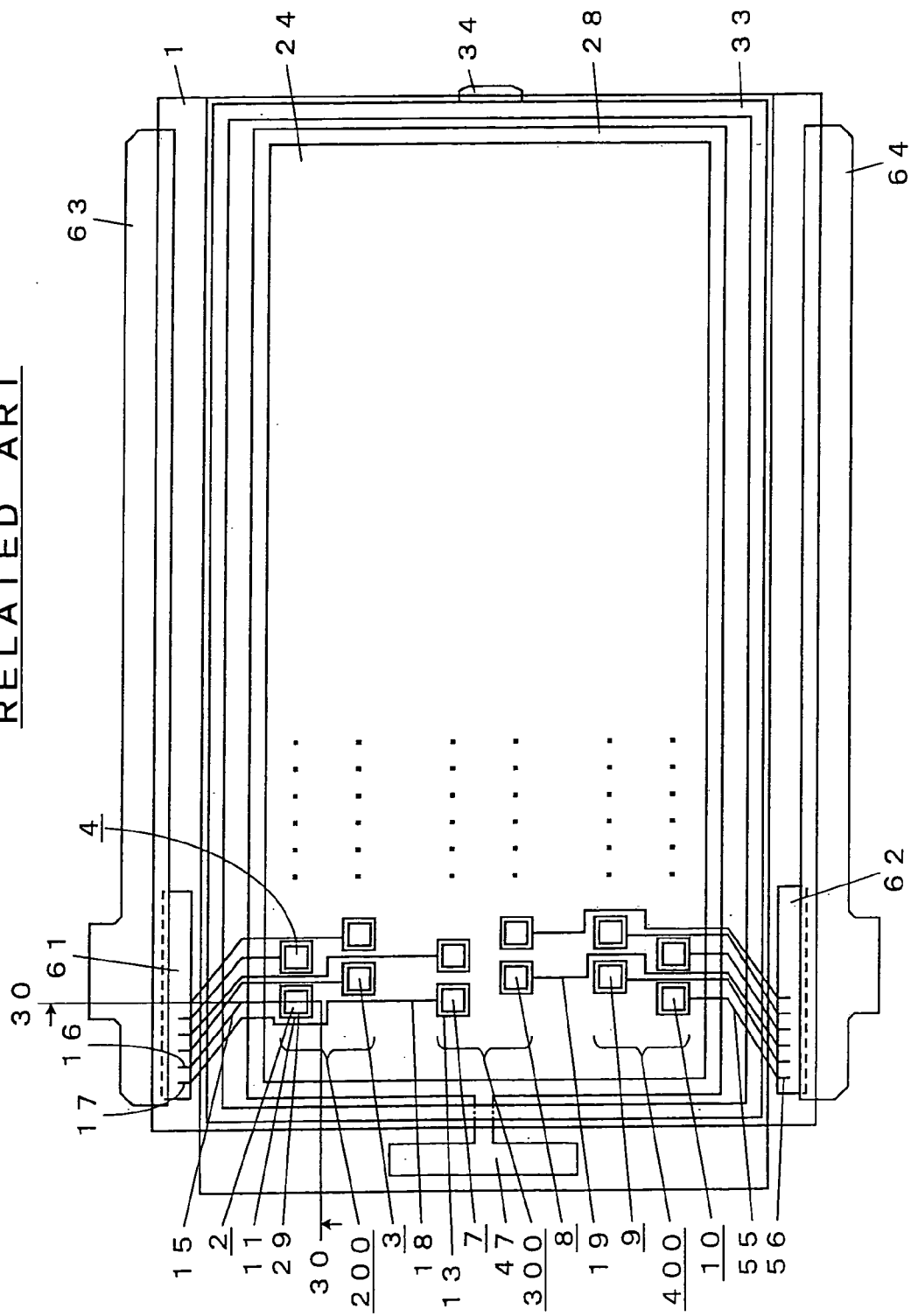
FIG. 29 is a plan view for illustrating wirings of electrodes in the liquid crystal shutter device shown in FIG. 28.
Figure 30:
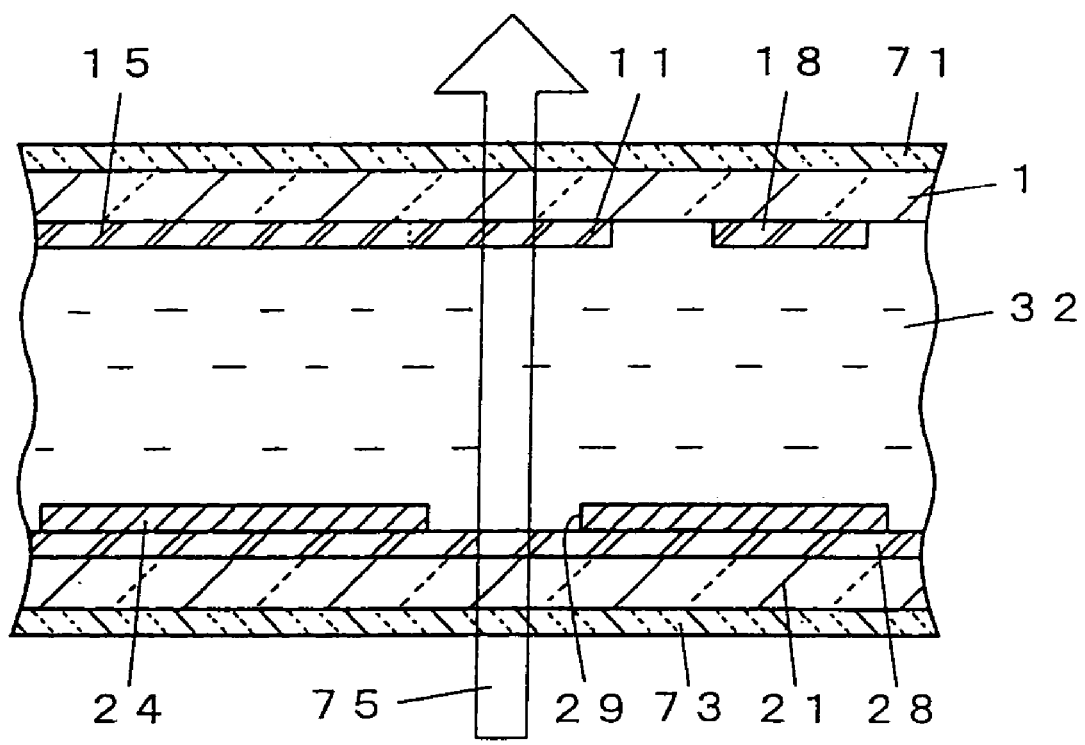
FIG. 30 is a sectional view taken along line 30—30 in FIG. 29.

Also, the arrangement of pixel electrodes being signal electrodes and lead-out electrodes which are provided on the first substrate 1, and the arrangement of connecting electrodes and respective driving ICs 61, 62 are similar to those described in BACKGROUND TECHNOLOGY using FIG. 28 to FIG. 30. That is a structure in which the pixel electrodes to form pixels are arranged at such positions on the first substrate 1 as corresponding to the pixels of respective lines of respective pixel rows, the lead-out electrodes are led out from the pixel electrodes to the connecting electrodes connected with the driving ICs, and respective pixel electrodes are connected with a first driving IC 61 or a second driving IC 62 via the lead-out electrodes and the connecting electrodes, so that the respective driving ICs 61, 62 can apply driving signals to respective pixel electrodes.

However, in this liquid crystal shutter device, the arrangement of the light shield films and the counter electrodes are as shown in FIG. 1 to FIG. 3. Note that, in FIG. 1 and FIG. 2, the light shield films and their connecting electrodes are shown by dashed and dotted lines, and the sealant, polarizers, and a retardation film are omitted to illustrate, for convenience of viewing. Further, in the overlapped portions of the lead-out electrodes and the counter electrodes, the underlying counter electrodes are shown by broken lines with a view to distinguish their vertical positions. The same is equally true of the plan views used in the descriptions below unless otherwise noted. In addition, in FIG. 1, the pixel electrodes, the pixel counter electrodes and the like shown are only part thereof which are arranged at end portions, omitting the rest of them in the drawing.

In this liquid crystal shutter device, on the second substrate 21, as conductive light shield films, there are provided an R black matrix 25, a G black matrix 26, and a B black matrix 27, which are made of a chromium film being a metal film, corresponding to respective colors of the pixel rows. Specifically, in a liquid crystal shutter function portion in which black matrix (BM) gaps 31 are provided between the black matrixes corresponding to the respective pixel rows, the pixel rows are provided, and wiring electrodes are led out, the black matrix is provided in three lines separately for each of the R, G, and B pixel rows. The respective black matrixes 25, 26, 27 are provided with BM openings 29 being smaller than the pixel electrodes at such positions as corresponding to the respective pixel electrodes provided on the first substrate 1, and the overlapped portions of the pixel electrodes and the BM openings 29 form the pixels where transmitted light amount is practically controlled.

Further, outside of the liquid crystal shutter function portion on a left side of FIG. 1, there are provided BM coupling portions 49 being light shield film connector to thereby electrically connect the respective black matrixes 25, 26, 27, and in a portion of the second substrate 21 projecting from the first substrate 1 outside the sealant 33, there is provided a BM pad electrode 50 so that electric signals can be applied to the respective black matrixes 25, 26, 27 therefrom. Incidentally, even though the respective black matrixes 25, 26, 27, the BM coupling portions 49, and the BM pad electrode 50 are differently named, these can be made of a same material, and provided in a same process by patterning and so forth.

Note that the black matrix gap 31 is shown smaller than the black matrixes in width in the drawing because the pixels are shown larger than their actual sizes, however, a practical pixel has a extremely small size in proportion to the substrate, and thus the pixel row is also small in width, where the black matrix is allowed to have a small width to the extent that the condensed light to the pixel row can not detour therearound, so that it is possible to reduce the area of the black matrix and instead to provide wider gap for the black matrix gap 31.

Although such a black matrix is not necessarily made of a conductive material, it is preferable to use a metal film such as a chromium film and the like rather than an insulating material such as resin or the like, since the former exhibits higher light shielding effect even though it is a thin film. Accordingly, it is inevitably required in this case to use the conductive material.

Further, substantially all over the inside of the sealant 33 on the second substrate 21 including on the respective black matrixes 25, 26, 27, there are provided an insulating film 30 made of photosensitive acrylic resin, and on the insulating film 30, the counter electrodes made of a transparent conductive film are provided as common electrodes. Incidentally, the insulating film 30 is provided only inside of the sealant 33 for the reason that the insulating film 30 is weaker than a transparent conductive film or the like in view of mechanical strength, hence, when the insulating film 30 is provided in such a position as overlaps the sealant 33, adhesiveness between the sealant 33 and the second substrate 21 cannot be ensured. In addition, in this approach, the BM pad electrode 50 does not have any thick insulating film 30 thereon, eliminating the need of removing the insulating film thereon.

This liquid crystal shutter device is structured to have, as the counter electrodes, for outside two rows of the R pixel row 200 and the B pixel row 400, pixel counter electrodes provided in a manner corresponding to respective pixel electrodes, formed at positions facing respective pixel electrodes, and having substantially the same shape as of the pixel electrodes; and common connecting electrodes for electrically connecting the respective pixel counter electrodes, the common connecting electrodes having lacing electrodes provided alongside the pixel rows and take-out electrodes for connecting the respective pixel counter electrodes and the lacing electrodes.

Specifically, in the case for example of an R1a pixel 2, as shown in FIG. 2, an R1a pixel counter electrode 35 is provided at a position facing an R1a pixel electrode 11 and is connected with an R1 lacing electrode 37 via an R1a take-out electrode 36. The overlapped portion of the R1a pixel electrode 11 and the R1a pixel counter electrode 35 forms the pixel. Among the overlapped portion, however, that functions actually as pixel is only a part thereof that overlapping the BM opening 29, as previously mentioned.

As for the rest of the pixel electrodes composing the first line pixels of the R pixel row 200, similarly, there are provided the counter electrodes which are connected with the R1 lacing electrode 37 via the take-out electrodes. Also, at the positions facing the pixel electrodes composing the second line pixels of the R pixel row 200 such as an R2a pixel 3, there are provided the pixel counter electrodes which are connected with an R2 lacing electrode 40 via the take-out electrodes. Altogether, the pixel counter electrodes and the pixel electrodes are aligned in a similar manner.

Here, in the liquid crystal shutter function portion, the R1 lacing electrode 37 and the R2 lacing electrode 40 are band-shaped electrodes independent from each other, provided at both sides of the pixel counter electrodes aligned in two lines as in the case of the pixel electrodes, and arranged in parallel with the R pixel row 200. The take-out electrodes from the pixel counter electrodes are connected with the lacing electrode of the corresponding side, respectively.

A similar structure is applied to those lacing electrodes provided for the pixels of the B pixel row 400, and the pixel counter electrodes which are provided at the positions facing the pixel electrodes composing the first and second line pixels are connected via the take-out electrodes with band-shaped B1 lacing electrode 43 and B2 lacing electrode 44, respectively.

Meanwhile, for the G pixel row 300 at the center, the counter electrode is formed in a band-shape facing the pixel electrodes. Specifically, a band-shape counter electrode is provided as a G1 lacing electrode 41 so as to face all pixel electrodes composing the first line pixels of the G pixel row 300, which, therefore, functions as the pixel counter electrodes as well as the lacing electrode in the case of the R pixel row 200 and the B pixel row 400. Accordingly, there is provided no electrodes corresponding to take-out electrode. Similarly, in the second line, there is provided a G2 lacing electrode 42. In this G pixel row 300, a portion in which one pixel electrode faces corresponding lacing electrode forms the pixel.

As mentioned above, in the liquid crystal shutter function portion, there are provided a total of six mutually independent lacing electrodes, two for each row of the three pixel rows.

Outside the liquid crystal shutter function unit on the left side of FIG. 1, there is provided an RGB coupling electrode 46 being a connector for electrically connecting these six lacing electrodes 37, 40, 41, 42, 43 and 44, and in a portion where the second substrate 21 projects from the first substrate 1 outside the sealant 33, there is provided an RGB pad electrode 47 so that electronic signals can be applied to the respective lacing electrodes therefrom. Incidentally, the counter electrodes including each lacing electrode and pixel counter electrode, the RGB coupling electrode 46, and the RGB pad electrode 47 can be made of the same material and provided in the same process of patterning or so forth, even though they are differently named.

In this liquid crystal shutter device, as previously mentioned, the counter electrodes and the black matrixes are provided with the insulating film 30 therebetween. Therefore, the respective electrodes composing the counter electrodes and the black matrixes are electrically insulated from each other by the insulating film 30, so that the counter electrodes and the black matrixes form a capacitor with the insulating film 30 therebetween.

In addition, the BM pad electrode 50 and the RGB pad electrode 47 connect with a third FPC 65 to thereby connect via the third FPC 65 with an outside light shield film driving circuit which generates light shield film driving signals to be applied to the black matrixes. Moreover, the light shield film driving circuit can be provided on the second substrate 21 so that the circuit connects with the BM pad electrode 50 without using FPC.

Further, in this liquid crystal shutter device, as shown in FIG. 3, there are provided a retardation film 72 and a first polarizer 71 on the opposite side surface of the liquid crystal layer 32 side of the first substrate 1, and a second polarizer 73 on the opposite side surface of the liquid crystal layer 32 side of the second substrate 21. Thus, the voltages applied to the liquid crystal layer 32 are changed by the respective pixel electrodes and the counter electrodes to thereby control the transmitting state of the light rays 75 through the pixel portions by the first polarizing plate 71, the retardation film 72, the second polarizing plate 73, and the liquid crystal layer 32, so that the irradiated light amount to the photosensitive paper 101 is controlled.

In this liquid crystal shutter device, the above-mentioned structure of the counter electrodes allow to reduce the areas of the counter electrodes to thereby further reduce the areas of the facing portions of the lead-out electrodes and the counter electrodes extremely. Accordingly, it is possible to lower such an influence of those signals applied to the pixel electrodes via the lead-out electrodes that affect the transmittance of the other pixels via the counter electrodes. In particular, it is possible to lower the influence on the first and third color pixels on both the sides, which is caused by driving waveforms applied to the pixel electrodes for the second color row at the center. On top of that, even if voltage changes at the lead-out electrodes affect a little the counter electrodes, the influence on the transmittance of the pixels ends in slight, since the capacitor formed by the counter electrode and the black matrix is capable of counteracting the influence.

Further, the black matrixes are capacitively coupled with the lead-out electrodes via the liquid crystal layer 32 and the insulating film 30. Meanwhile, the counter electrodes are capacitively coupled with the black matrix via the insulating film 30. Therefore, it is possible to greatly lower an influence on the counter electrode caused by voltage changes at the lead-out electrodes via the black matrixes held therebetween.

Furthermore, between the liquid crystal shutter function portion and the sealant 33, the respective RGB black matrixes are connected with each other via the BM coupling portion 49, and also the respective lacing electrodes are connected with each other via the RGB coupling electrode 46, whereby it is allowed to connect them with outside circuits only with one BM pad electrode 50 and one RGB pad electrode 47, respectively. Accordingly, the number of the pad electrodes can be reduced, whereby possible to reduce the projecting areas of the second substrate 21 from the first substrate 1 and to increase the areas of the pad electrodes, so that the connection is stabilized. Also, it is easily possible to establish connection with the not-shown outside circuits by removing the insulating films 30 on the respective pad electrodes in view of advantages such as small number of pat electrodes, larger connection areas, concentrated removal areas of the insulating film 30, and connection at low resistance.

As driving signals for driving the liquid crystal shutter device of the above-mentioned structure, those for example shown in FIG. 6 can be used. In FIG. 6, the horizontal axis indicates time and the vertical axis indicates voltages. The reference signs T1, T2, T3 on the horizontal axis are flame periods for exposing one position, respectively. The flame periods are divided into a liquid crystal refresh period Tr1 for refreshing transmittances of pixels once to a certain value, and a first half selection period Ts1 and a latter half selection period Ts2 for controlling the transmittances of the pixels by the signals corresponding to the image to be formed.

The reference numeral 127 denotes a counter electrode driving signal to be applied to a counter electrode, the reference numeral 128 denotes a pixel electrode driving signal to be applied to a pixel electrode, and the reference numeral 129 denotes a combined signal to be applied to the liquid crystal layer 32 which equals to the difference between the counter electrode driving signal 127 and the pixel electrode driving signal 128. The reference numerals 130 and 131 denote a first BM driving signal and second BM driving signal respectively, they are light shield film driving signals to be applied to the black matrixes.

In this liquid crystal shutter device, so-called normally white mode is adopted, where the transmittance becomes large (white) when the voltages applied to the liquid crystal layer 32 is 0 (zero), and the transmittance becomes small (black) when the voltages applied have a large absolute value. In the liquid crystal refresh period Tr1, voltages of V5–V1 and V1–V5 are alternately applied to the liquid crystal layer 32 alternately by the counter electrode driving signal 127 and the pixel electrode driving signal 128 to thereby bring all pixels into black states. This is because the higher transmittance can be obtained by making them once in black states before making them in white states.

In the selection period Ts1 thereafter, a voltage of V5 is applied to the counter electrodes, and a voltage of V1 or V5 is applied to the pixel electrodes while changing the ratio of application time in accordance with the tones, in other words, where a pulse width modulation driving is performed. As in T1, when a voltage of V1 is applied consistently, transmittance at the pixel is minimized, when a voltage of V5 is applied consistently as in T3, the transmittance is maximized, and when both the voltages are applied as in T2, the pixel transmittance results in a gray tone. In the latter half selection period Ts2, a signal which is symmetrical to the signals applied in the period Ts1 with respect to a voltage of V3 is applied during the same time period to thereby prevent the liquid crystal layer 32 from receiving DC voltages.

Meantime, in this liquid crystal shutter device, the black matrixes are also conductive, it is whereby conceivable that the voltage changes at those lead-out electrodes facing the black matrixes affect the voltages of the other electrodes via the black matrixes, so that the transmittances of the pixels are changed. The black matrixes are distant from the lead-out electrodes and the insulating film 30 with a low relative dielectric constant exists between the black matrix and lead-out electrodes, proving that the effect is not so large. However, the black matrixes need enough width to prevent light detouring therearound, meaning it is impossible to reduce its arrangement areas so much as compared to the counter electrodes, so that it is contrived to lower the influence by fixing potentials of the black matrixes to a predetermined level.

The signals for this purpose are first BM driving signals 130 and second BM driving signals 131. With application of these signals, the black matrixes are kept at 0V, which is the intermediate potential of the driving signals of the liquid crystal cell, to thereby prevent the voltage changes at the lead-out electrodes from affecting the other electrodes via the black matrixes. Incidentally, the first BM driving signals 130 are those signals used when the light shield film driving circuit or the FPCs, and the black matrixes are connected with each other at low resistance at the BM pad electrode 50, and the second BM driving signals 131 are those signals used when capacitively coupled via a thin insulating film. In the latter case, when rectangular waves at a voltage of V5–V1 and V1–V5, mainly at 0V being the intermediate potential, are applied as AC driving signals, then stabilized at 0V with time due to the capacitive coupling. These BM driving signals 130 and 131 can be generated by a simple circuit composed of a reference voltage generating circuit, a reference clock generating circuit, a frequency dividing circuit, and so forth.

Incidentally, although the voltages applied by the BM driving signals are not limited to the intermediate voltages, in the case of the voltages deviated from the intermediate, effectiveness falls when the voltages applied to the liquid crystal layer 32 is shifted to the opposite side. Therefore, the intermediate voltages are preferable.

In such a liquid crystal shutter device, in the same manner as in the case described in BACKGROUND TECHNOLOGY using FIG. 7, after fixing the signals to be applied to the R1a pixel 2 to a signal of 127th tone, when the tones of all the first line pixels of the G pixel row 300 of which lead-out electrodes are led out around the R pixel row 200 side are shifted from 127th tone to 255th tone sequentially pixel by pixel, the changes in transmittance at the R1a pixel 2 are shown in the graph in FIG. 7 by the curved line Y.

Even in this liquid crystal shutter device, some changes in the transmittance still arise, yet, even after shifted 10 pixels of the G pixel row 300, the transmittance changes are no more than 0.5%, proving significant reduction in transmittance changes as compared to the conventional device shown by the curbed line X.

Therefore, according to this liquid crystal shutter device, it is possible to control the light transmittances at the pixels composing the respective pixel rows to desired values. And the optical printer structured employing this liquid crystal shutter device is capable of forming a high quality of image without irregular by controlling light irradiation to the photosensitive member in an adequate manner.

Incidentally, in this liquid crystal shutter device, the pixel counter electrodes and the lacing electrodes are connected via the take-out electrodes, and the positions of the lacing electrodes are provided substantially parallel to the pixel rows at a position different from the pixels to the moving direction of the photosensitive paper, whereby the pixel counter electrodes, the take-out electrodes, or the lacing electrodes do not face, near the pixel, the lead-out electrodes corresponding to the pixels of the different pixel row, allowing to prevent the influence of applied voltages which occurs between the pixels of the different pixel rows. Further, the lacing electrodes are provided for each pixel line of the respective pixel rows, so that it is possible to prevent the influence of the applied voltages from occurring via the lacing electrodes of the different pixel rows. Furthermore, the six lacing electrodes are provided respectively for each line of respective pixel rows, so that it is still possible to lower the influence within the same pixel row. Specifically, there occurs no image irregular for each line, so that the reduction in irregulars in the lateral direction, which occur depending on the image, can be realized to a large degree.

Preferably, here, for reducing the areas facing the lead-out electrodes provided on the first substrate 1, the lacing electrodes are provided in such a position as facing smaller number of lead-out electrodes as much as possible. For the case for example of the R2 lacing electrode 40 shown in FIG. 1, preferably, it is provided between the R pixel row 200 and the G pixel row 300. In doing so, the lacing electrode does not face any lead-out electrode led out from the pixels of the corresponding line or the pixels of the other line of the same color row, so that the potential changes of the lacing electrode are enabled to be less affected by potentials of the lead-out electrodes.

Referring to the structure of the counter electrodes, here, there is no lead-out electrode crossing over the G pixel row 300 at the center, so that the counter electrodes corresponding to the G pixel row 300 are formed in the band-shape, however, it may be formed using the pixel counter electrodes and the common connecting electrodes as in the case of the R pixel row 200 and B pixel row 400.

Also, as a connection structure between the BM pad electrode 50, the third FPC 65, and the like, such a connection structure may be adopted as will be described in the following description of a second embodiment.

Second Embodiment: FIG. 8 to FIG. 11

Figure 8:
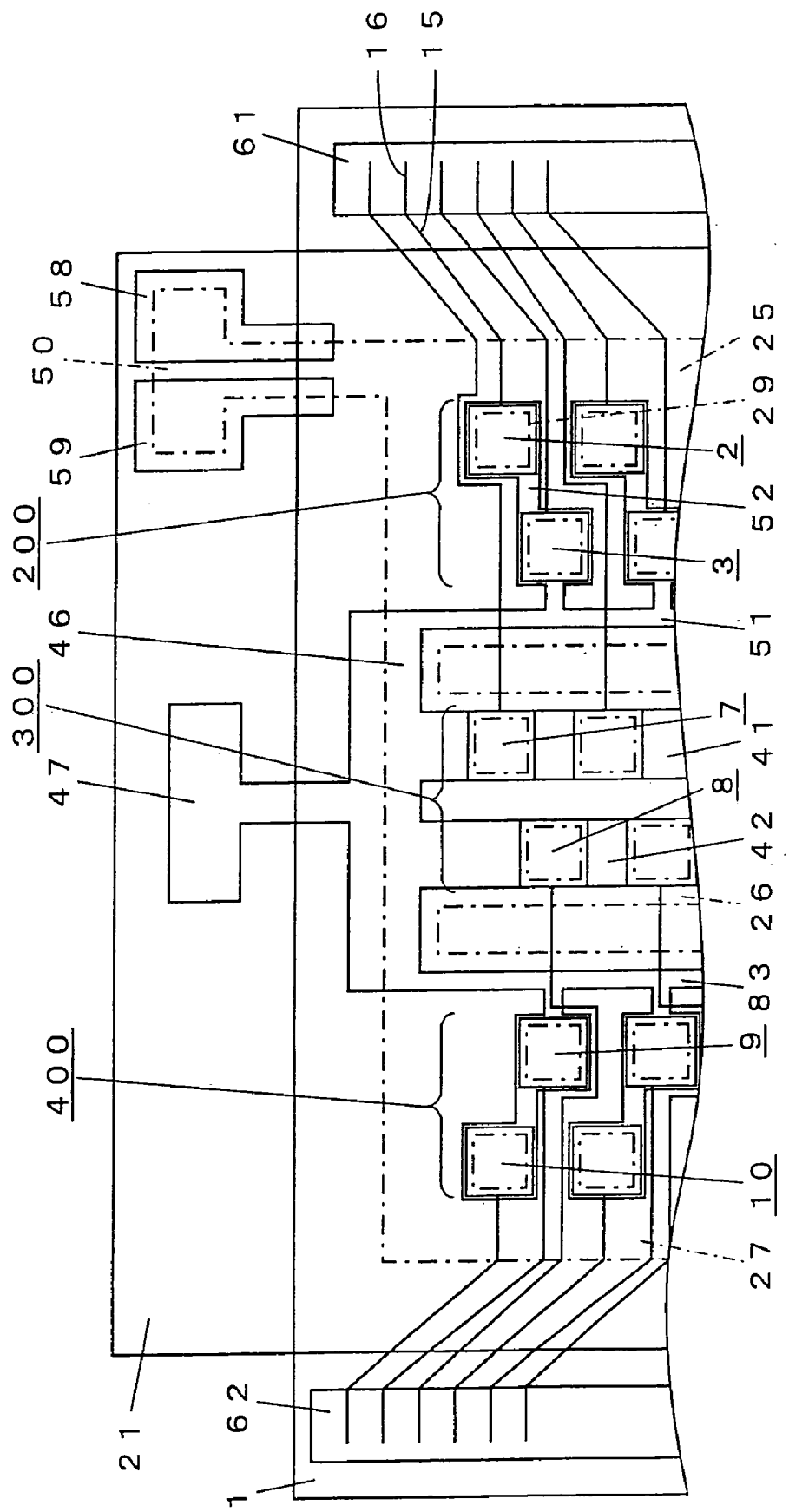
FIG. 8 is a partial plan view for illustrating an arrangement of electrodes and light shield films in a liquid crystal shutter device according to a second embodiment of the invention.
Figure 9:
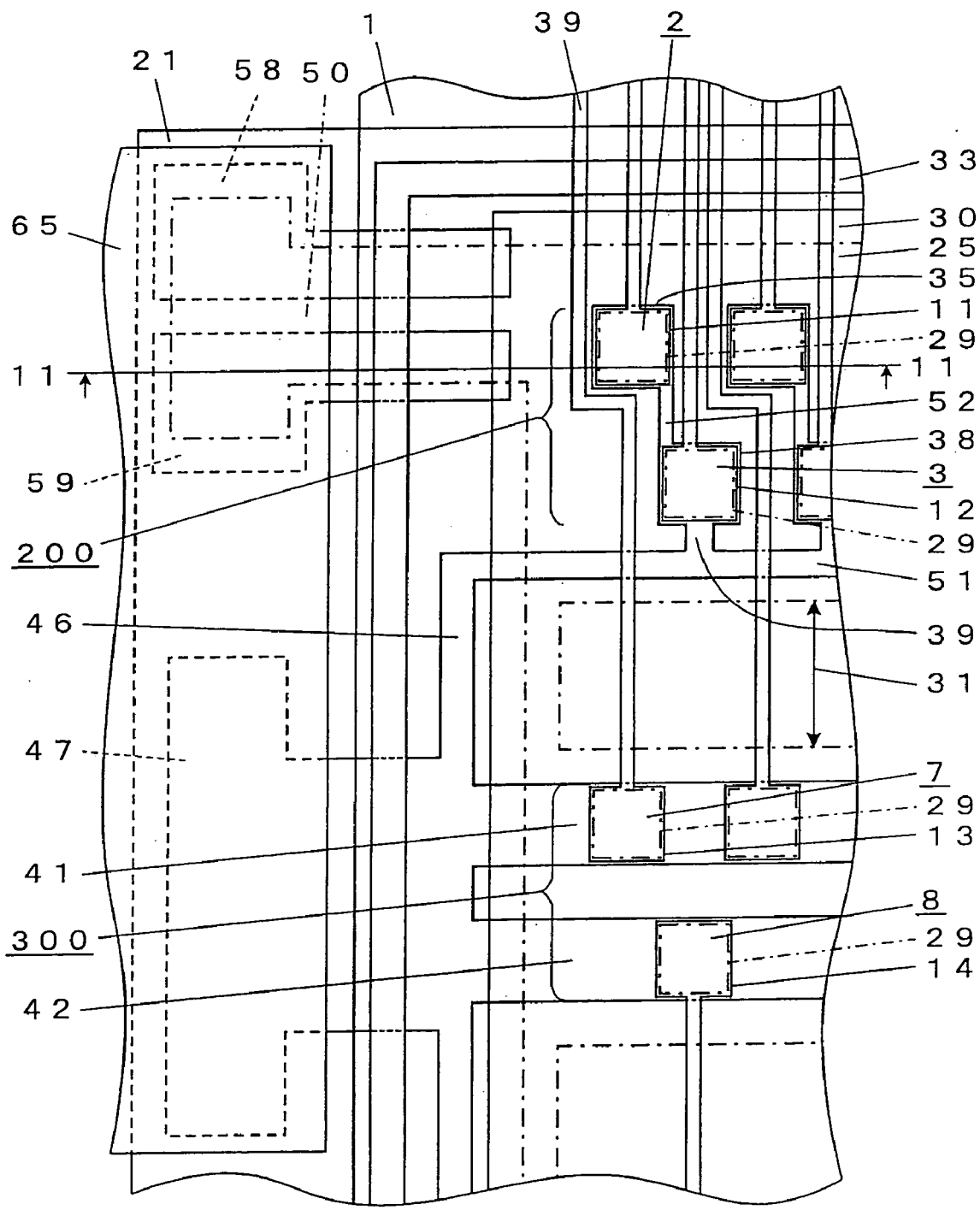
FIG. 9 is an enlarged partial plan view showing a part of FIG. 8, in which a sealant and insulating films are also shown.
Figure 10:
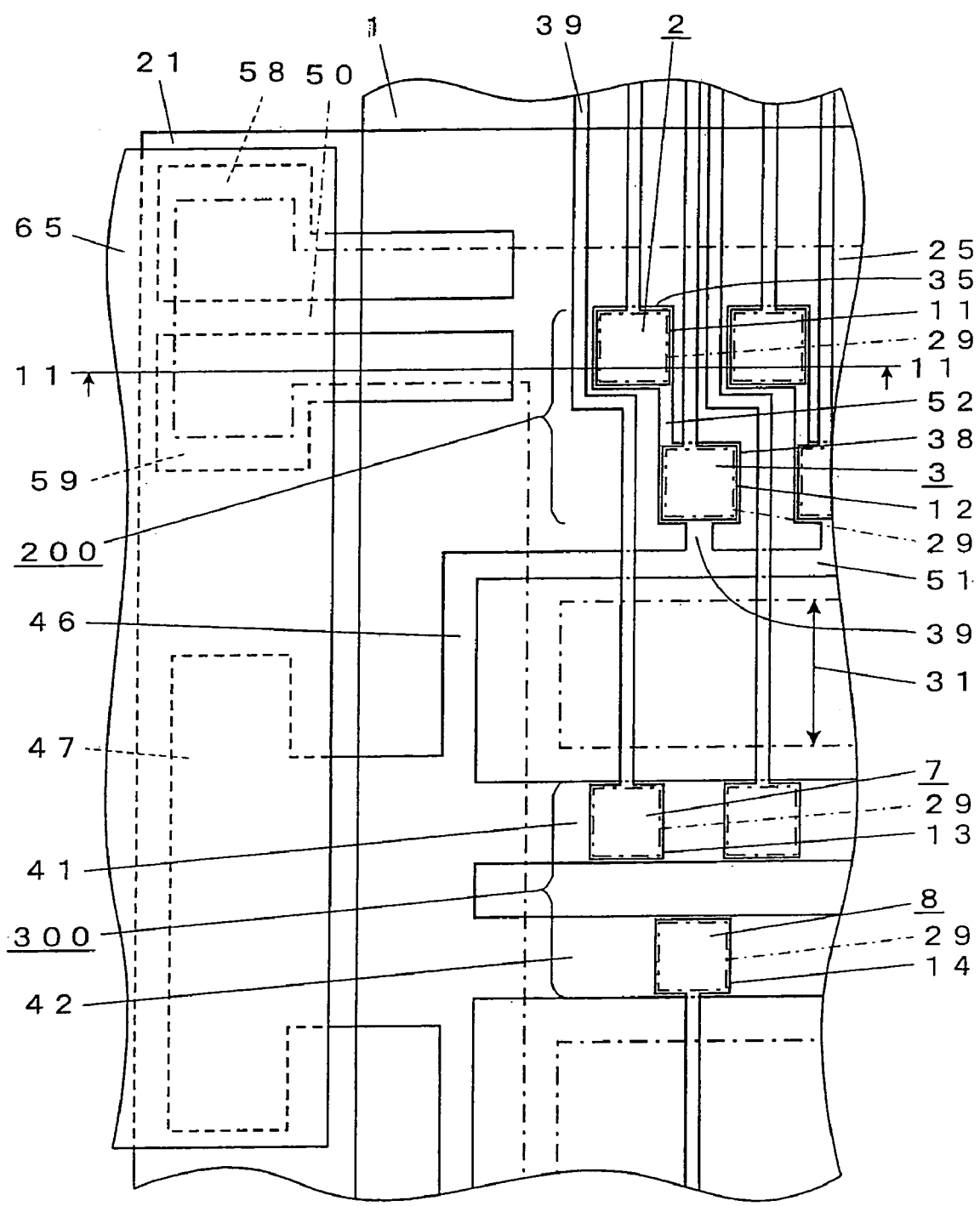
FIG. 10 is a view omitting to illustrate the sealant and the insulating films included in FIG. 9.
Figure 11:
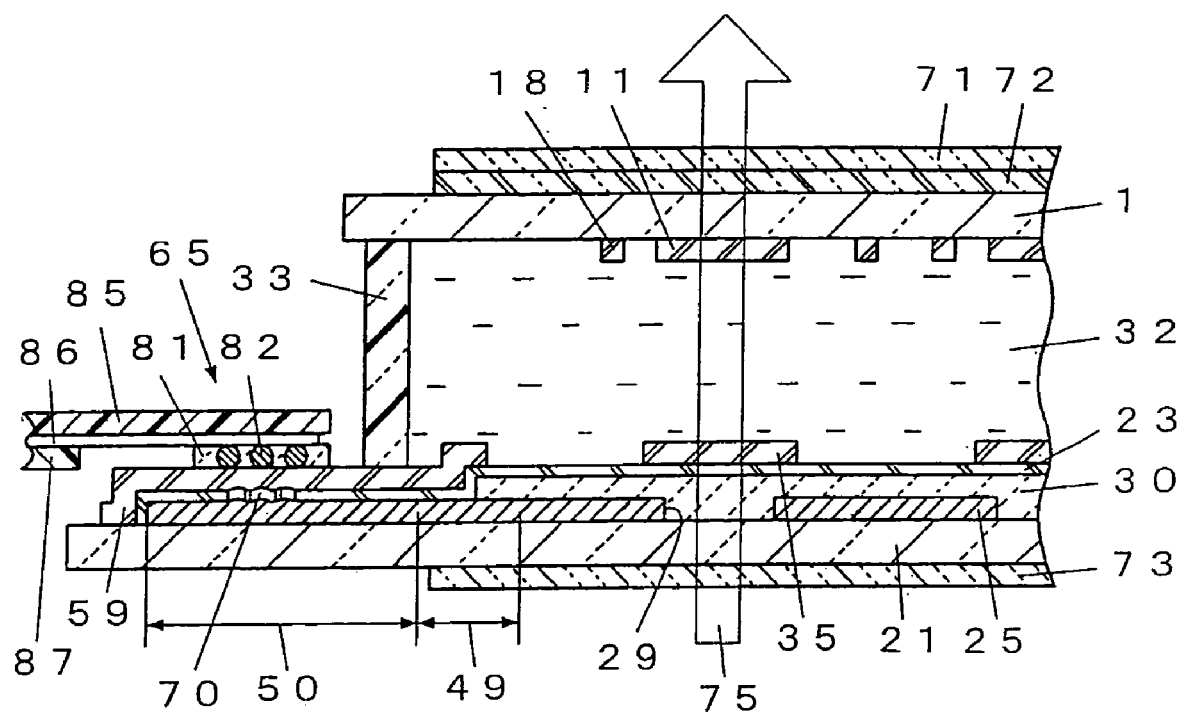
FIG. 11 is a partial sectional view showing a part of the section taken along line 11—11 in FIG. 9.

Next, a second embodiment of the liquid crystal shutter device of the invention will be described. FIG. 8 is a partial plan view for illustrating an arrangement of electrodes and light shield films in this liquid crystal shutter device, FIG. 9 is an enlarged partial plan view showing a part of FIG. 8, in which a sealant and an insulating film are also shown, FIG. 10 is a view omitting to illustrate the sealant and the insulating film included in FIG. 9, and FIG. 11 is a partial sectional view showing a part of the section taken along line 11—11 in FIG. 9. Note that FPCs to be connected with the liquid crystal shutter device is omitted to illustrate in FIG. 8. In addition, in these drawings, for portions corresponding to the structure described in the first embodiment, the same reference numerals are used.

Additionally, this liquid crystal shutter device differs from the liquid crystal shutter device of the first embodiment in regard only to the structure of the counter electrodes, a thin insulating film 23 provided on the insulating film 30, and a first BM connecting electrode 58 and a second BM connecting electrode 59 provided on the BM pad electrode 50, so that the description will be provided only in this regard.

Have it beginning with the counter electrodes, this liquid crystal shutter device is structured to have the same band-shaped two lacing electrodes for the central G pixel row 300, namely a G1 lacing electrode 41 and a G2 lacing electrode 42, as in the case of the first embodiment. However, for the outside two rows, namely an R pixel row 200 and a B pixel row 400, for each row, it has pixel counter electrodes aligned in two lines so as to face respective pixel electrodes, a lacing electrode on one side thereof, and take-out electrodes for commonly connecting pairs of the pixel counter electrodes composing two lines of the pixel counter electrodes to thereby connect with the lacing electrode.

Specifically, for example as shown in FIG. 9, there are provided, in the R pixel row 200, an R1a pixel counter electrode 35 facing an R1a pixel electrode 11 forming an R1a pixel 2 and an R2a pixel counter electrode 38 facing an R2a pixel electrode 12 forming an R2a pixel 3 in which these are commonly connected, as a pair, via an R1a R2a inter-pixel electrode 52 being a part of the take-out electrode to thereby connect with an R lacing electrode 51 via an R2a take-out electrode 39. Similarly, for the other pixel electrodes composing the pixels of the R pixel row, there are provided the pixel counter electrodes as well, and pairs of the pixel counter electrodes of the first and second lines are commonly connected via the take-out electrodes to thereby connect with the R lacing electrode 51.

The same is equally true for those provided for the pixels of the B pixel row 400, the respective pixel counter electrodes are connected with a band-shaped lacing electrode 83 via the take-out electrodes, respectively.

In this manner, in the liquid crystal shutter function unit, a total of four mutually independent lacing electrodes are provided, one for each of the R pixel row 200 and the B pixel row 400, and two for G pixel row 300.

Outside the liquid crystal shutter function portion on the left side of FIG. 1, there are provided an RGB coupling electrode 46 being a connector to electrically connect these four lacing electrodes 51, 41, 42 and 83, and an RGB pad electrode 47 as in the case of the first embodiment, so that electric signals can be applied to each of the lacing electrodes therefrom.

In this liquid crystal shutter device, as mentioned before, the lacing electrodes for the R pixel row 200 and the B pixel row 400 are reduced to one for each row in number, allowing to reduce the areas of the lacing electrodes facing the lead-out electrodes led out from the pixel electrodes of the G pixel row 300 as compared to the first embodiment having two for each row. Accordingly, the influence of driving signals to the G pixel row 300 on transmittances of the pixels of the R pixel row 200 and the B pixel row 400 can further be lowered as compared to the first embodiment.

Further, in this liquid crystal shutter device, an organic film made of acrylic resin is used for the insulating film 30, therefore, it is not preferable for patterning to provide counter electrodes, being a common electrode, of a transparent conductive film directly on the organic film due to its weak adhesiveness. Therefore, a silicon oxide film ($SiO_2$) having a thickness of 100 Å to 200 Å is further provided as the thin insulating film 23 on the insulating film 30 formed of the organic film, and the counter electrodes are provided thereon. This allows improvements in adhesiveness and patterning accuracy of the transparent conductive film.

Incidentally, although the insulating film 30 is provided inside of a sealant 33 and not on the BM pad electrode 50, the thin insulating film 23 is provided all over a second substrate 21 and still on the BM pad electrode 50 as well. This is because the thin insulating film 23 does not exert bad effect on adhesiveness of the sealant 33, so that it can be provided even in an overlapping portion with the sealant 33.

Similarly, when using a chromium film for the black matrix as in the case of this liquid crystal shutter device, there is formed a nonconductive natural oxide film on the chromium film, so that it is difficult to simply ensure electrical conductivity with the circuits such as the FPCs at the BM pad electrode 50.

For ensuring the electrical conductivity, in this liquid crystal shutter device, there are provided a first BM connecting electrode 58 and a second BM connecting electrode 59 on the thin insulating film 23 provided on the BM pad electrode 50. These electrodes can be formed of the same material and in the same process as of the counter electrodes. Incidentally, a given gap is provided between the first BM connecting electrode 58 and the second BM connecting electrode 59 so that these electrodes are insulated from each other as long as the thin insulating film 23 retains its electrical insulation performance.

However, with pulse voltages or a DC voltage at around 20 volts (V) being applied to between the first BM connecting electrode 58 and the second BM connecting electrode 59 for a short time period, it is possible to electrically break down the thin insulating film 23 between the first BM connecting electrode 58 and BM pad electrode 50 or the same between the second BM connecting electrode 59 and the BM pad electrode 50, so that electrical conductive portion 70 can be formed with ease, as a conductive area. In FIG. 11, there is shown a state where part of the thin insulating film 23 between the BM pad electrode 50 and the second BM connecting electrode 59 is electrically broken down and removed, and the electrical conductive portion 70 is formed.

As shown in FIG. 11, with a metal electrode 86 provided on an FPC base film 85 and an anisotropic conductive film being a mixture of polyimide resin 81 and conductive particles 82, the first and second BM connecting electrodes 58 and 59, and the third FPC 65 are electrically connected via the metal electrode 86 on the third FPC 65 and the conductive particles 82 by heat and pressure, and the state under pressure is firmly maintained by the polyimide resin 81. Further on the metal electrode 86 of the third FPC 65, there is provided an FPC cover film 87 for preventing erosion of the metal electrodes and electrical short between the metal electrodes caused by a foreign particle.

As mentioned before, provision of the electrical conductive portion 70, and its connection with the third FPC 65 via the first and second BM connecting electrode 58 and 59 allow assured connection at low resistance. Furthermore, in the electrical conductive portion 70, in such cases where voltages are applied to the black matrixes, where charges travel between the black matrixes and, the pixel electrodes, the lead-out electrodes, or the pixel counter electrodes arise, and the like, there occurs stationary charge transfer in which current flows. As a result, electrical processing is steadily performed at the electrical conductive portion 70. Accordingly, even when using chrome for the black matrixes and thereby generating the natural oxide film in the electrical conductive portion 70, the insulation can be broken down instantly by the electrical processing so that conductive state can be maintained in a stable manner. This enables to enhance reliability of the device.

Incidentally, it is also possible to apply AC driving signals to the black matrixes via capacitance formed by the BM connecting electrodes 58, 59, the BM pad electrode 50, and the thin insulating film 23 therebetween, without providing the electrical conductive portion 70. Further, it is still possible to provide a light shield film driving circuit on the second substrate 21 and connect it with the BM pad electrode 50 without using FPCs.

Figure 12:
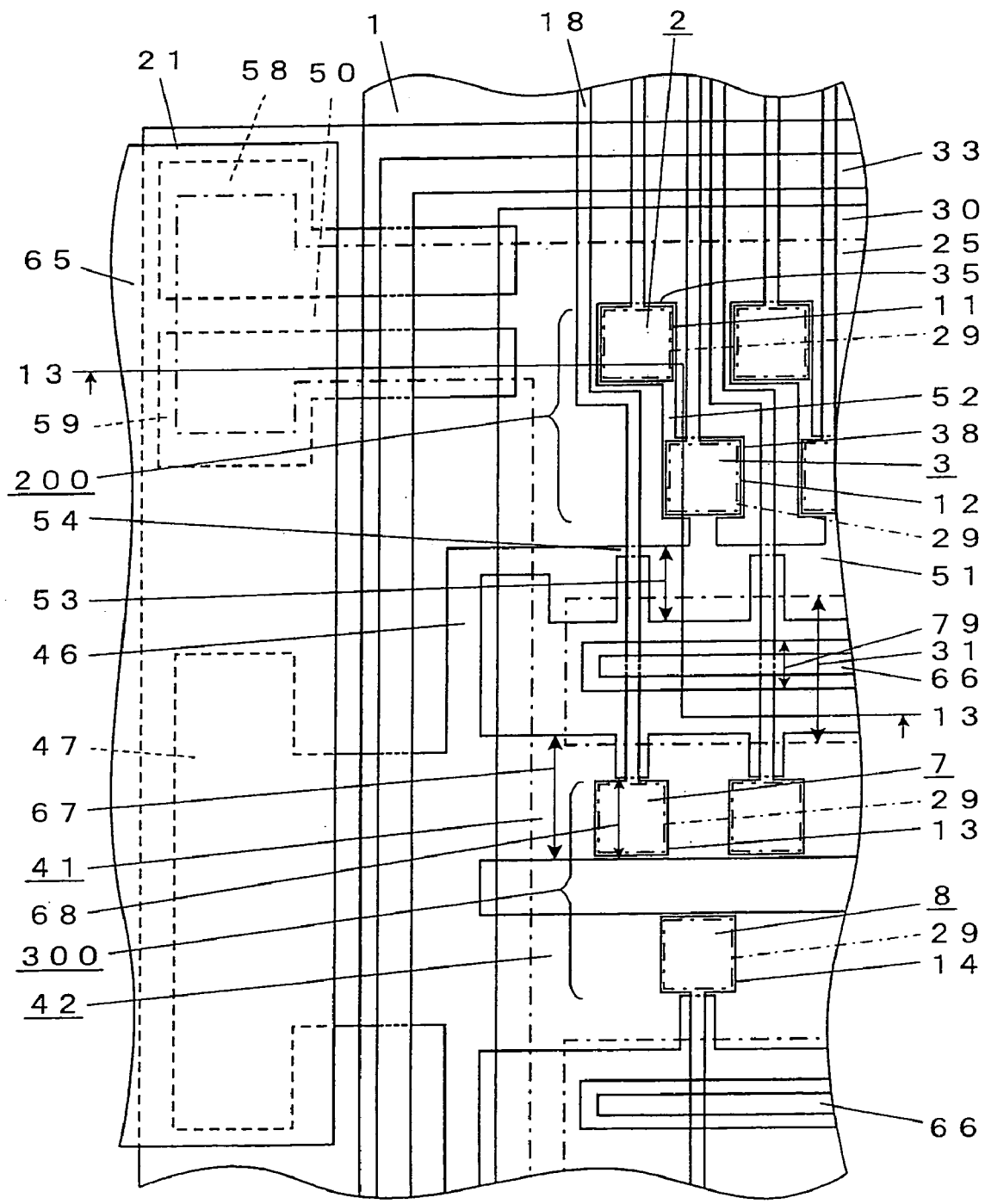
FIG. 12 is a partial plan view corresponding to FIG. 9 for illustrating an arrangement of electrodes and light shield films in a liquid crystal shutter device according to a third embodiment of the invention.
Figure 13:
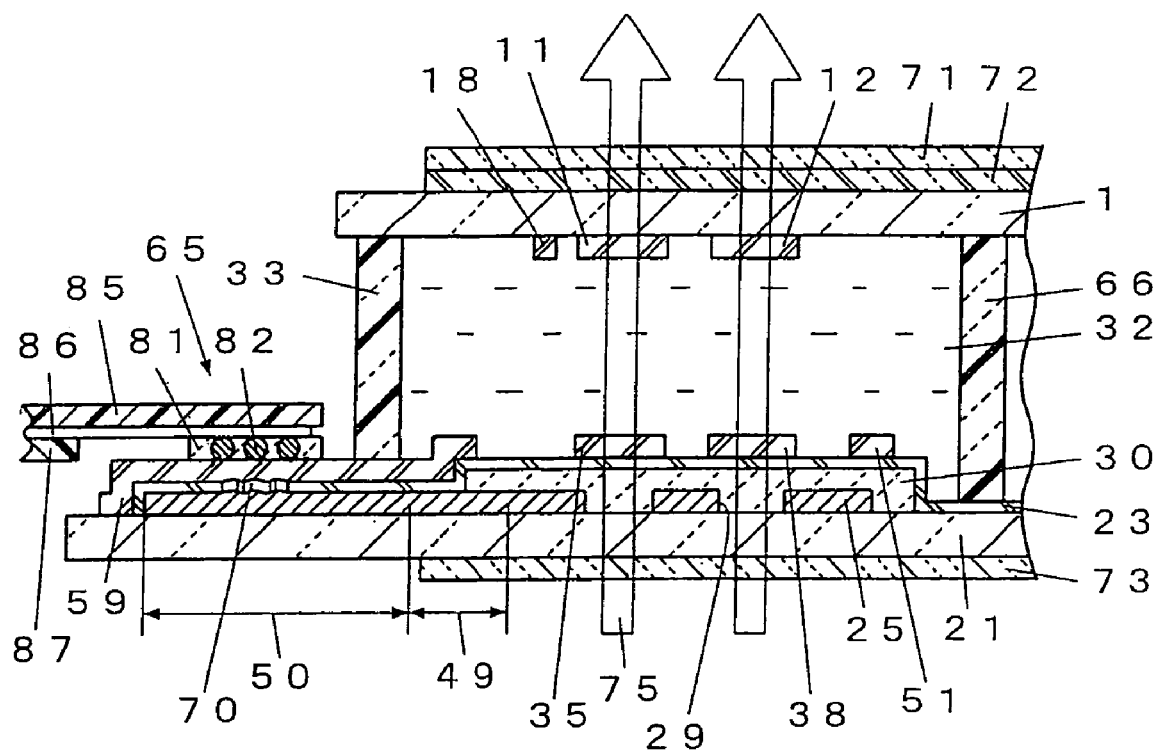
FIG. 13 is a partial sectional view showing a part of the section taken along line 13—13 in FIG. 12.
Figure 14:
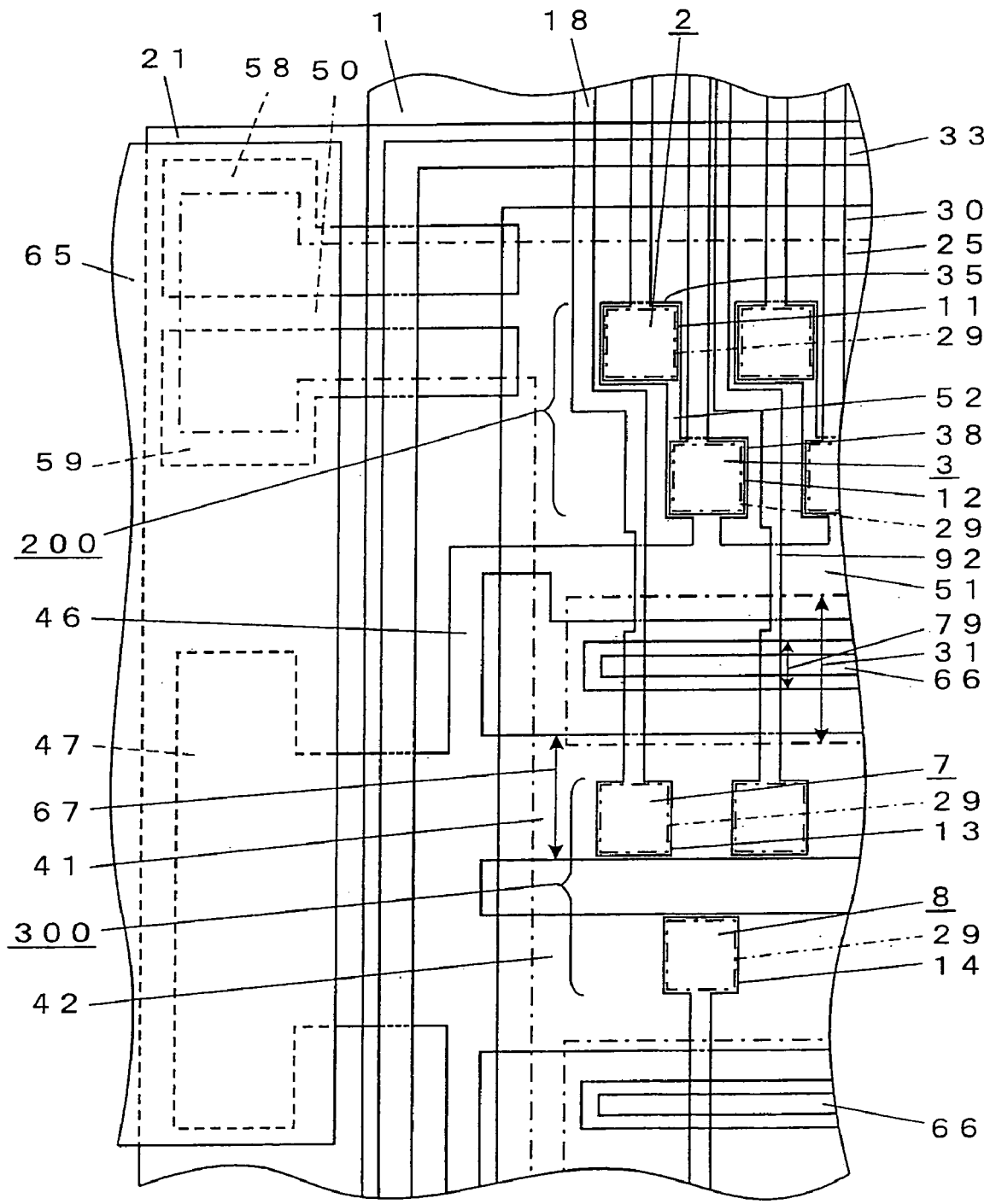
FIG. 14 is a partial plan view corresponding to FIG. 12 showing a configuration of lead-out electrodes and lacing electrodes according to a modification example of the third embodiment of the invention.

Third Embodiment and its Modification Example: FIG. 12 to FIG. 14

Subsequently, a third embodiment of the liquid crystal shutter device of the invention and its modification example will be described. FIG. 12 is a partial plan view corresponding to FIG. 9 for illustrating an arrangement of electrodes and light shield films of the liquid crystal shutter device, FIG. 13 is a partial sectional view showing a part of the section taken along line 13—13 in FIG. 12, and FIG. 14 is a partial plan view corresponding to FIG. 12 showing a structure of lead-out electrodes and lacing electrodes in the modification example. In these drawings, for portions corresponding to the first and the second embodiments, the same reference numerals are used.

Additionally, these liquid crystal shutter devices differ from that of the second embodiment in regard only to a slit-like insulating film space 79 provided on an insulating film 30, an inter-color sealant 66 provided in the space, and the shapes of the lacing electrodes or the lead-out electrodes, so that the description will be provided only in this regard.

Similarly, in the liquid crystal shutter device according to this embodiment, the insulating film 30 is provided substantially all over the inside of a sealant 33 on a second substrate 21 including on black matrixes. Meanwhile, as shown in FIG. 12, on a part of black matrix space 31, there is provided the slit-like insulating film space 79 having no insulating film 30. In the slit-like insulating film space 79, as shown in FIG. 13, there is provided the inter-color sealant 66 for adhering the first substrate 1 and the second substrate 21 to each other by holding a given gap therebetween.

This inter-color sealant 66 is a mixture of epoxy resin and a spacer made of glass fiber, glass bead, or plastic bead, and adheres the first substrate 1 and the second substrate 21 to each other as with the sealant 33. As was described in the first embodiment, the adhesiveness of the sealant goes low in those portions having the insulating film 30, however, this inter-color sealant 66 is provided in the slit-like insulating film space 79 having no insulating film 30, so that the inter-color sealant 66 is capable of surely adhering to the first substrate 1 and the second substrate 21.

Incidentally, there is provided no spacer in the remaining portions other than the sealant 33 and the inter-color sealant 66, particularly in the pixels. This is because the spacer in the pixel affects the transmittance control by voltage application to a liquid crystal layer 32.

Still, in this liquid crystal shutter device, counter electrodes are structured in the same manner as in the second embodiment, and there are provided, for the G pixel row 300, the two band-shaped lacing electrodes which function also as pixel counter electrodes, and for the R pixel row 200 and the B pixel row 400, pairs of the counter pixel electrodes which are commonly connected via take-out electrodes respectively and are thereby connected with the lacing electrodes provided on one side thereof.

However, those portions of respective lacing electrodes facing the lead-out electrodes are made narrower than the remaining portions in line width.

Specifically, as shown for example in FIG. 12, those portions of R lacing electrode 51 facing the lead-out electrodes led out from pixel electrodes of the G pixel row 300 are formed as small width portions 54 having a small line width, and the remaining portions are formed as wide width portions 53 having a wide line width. The same is equally true of the lacing electrodes of the B pixel row 400 even though they are omitted in the drawings. Also, for G1 lacing electrode 41 and G2 lacing electrode 42, those portions in which the lead-out electrodes are led out from the pixel electrodes are formed as small width portions 68 and the remaining portions are formed as wide width portions 67.

As mentioned above, the lacing electrodes are formed to have smaller width for those portions facing the lead-out electrodes to thereby reduce the facing areas of the lead-out electrodes and the lacing electrodes, so that the effect of the voltage changes at the lead-out electrodes on the transmittance of the other pixels can be reduced. At the same time, the remaining portions of the lacing electrodes not facing the lead-out electrodes are formed to have wide width, so that resistance of the lacing electrode can be prevented from increasing. Incidentally, the lacing electrode of the G pixel row is also provided with the wide width portions 67 in consideration of the balance with the R lacing electrode 51 and a B lacing electrode, whereas, it may be formed only with the small width portion 68 from first to last.

Note that, although an example of the lacing electrode provided with the wide width portions and the small width portions has been described here, the lead-out electrode may be provided with small width portions 92 at portions thereof facing the lacing electrodes by making the portions narrower than the remaining portions, while the lacing electrode having the same line width from first to last, as shown in FIG. 14. Also, in this case, it is possible to reduce the facing areas of the lead-out electrodes and the lacing electrodes, and whereby allowed to lower the effect of the voltage changes at the lead-out electrodes on the transmittance of the other pixels.

Figure 15:
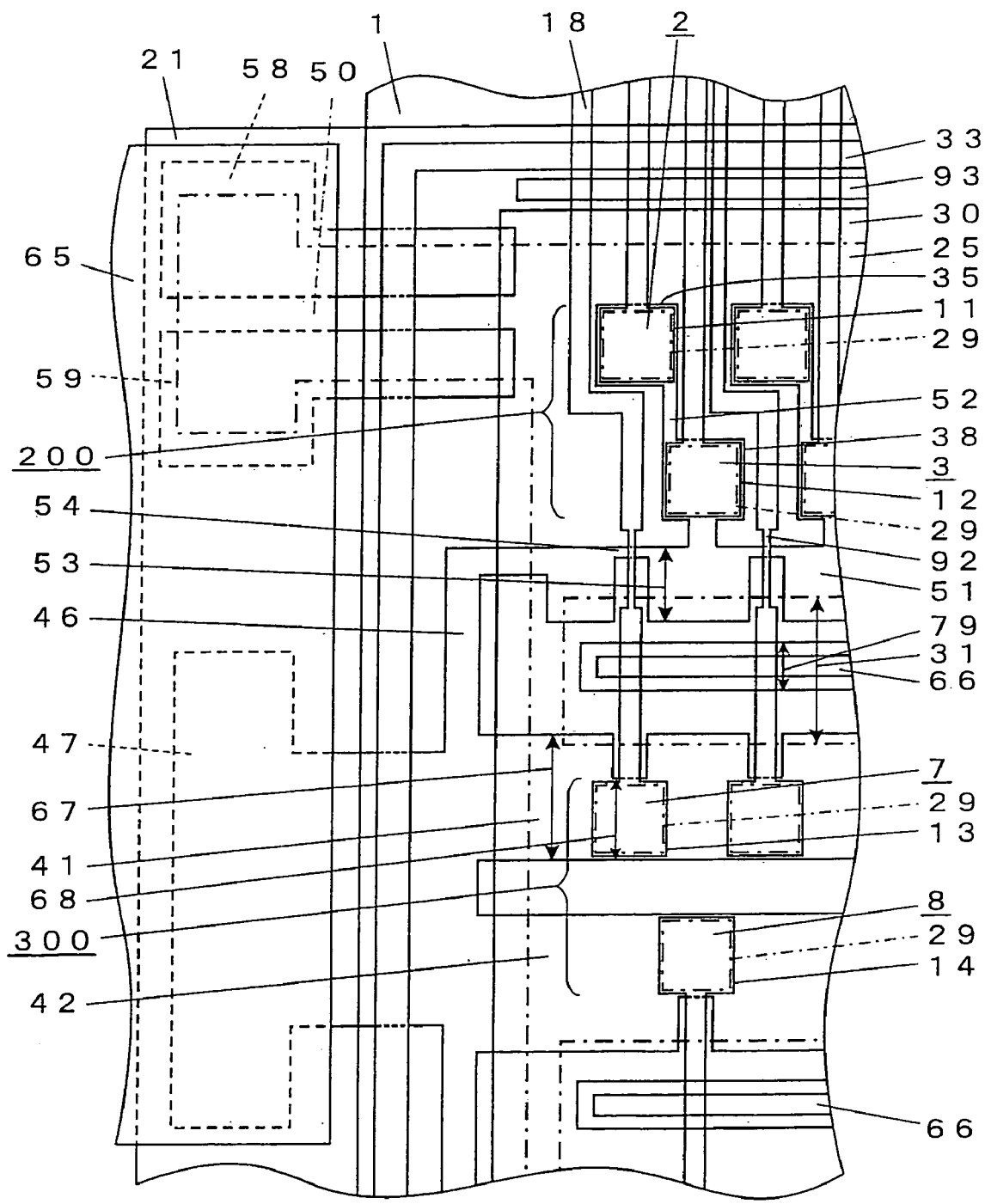
FIG. 15 is a partial plan view corresponding to FIG. 12 for illustrating an arrangement of electrodes and light shield films in the liquid crystal shutter device according to a fourth embodiment of the invention.

Fourth Embodiment: FIG. 15

Subsequently, a fourth embodiment of the liquid crystal shutter device of the invention will be described. FIG. 15 is a partial plan view corresponding to FIG. 12 for illustrating an arrangement of electrodes and light shield films in the liquid crystal shutter device. In the drawing, for portions corresponding to the first to third embodiments, the same reference numerals are used.

Additionally, this liquid crystal shutter device differs from that of the third embodiment in regard only to an outline edge sealant 93 provided in the vicinity of a sealant 33 and small width portions provided in both lacing electrodes and lead-out electrodes, so that the description will be provided only in this regard.

In this liquid crystal shutter device, there is provided a outline edge sealant 93 at a portion inside the sealant 33 outside the region provided with the insulating film 30. Although no spacers are mixed into the sealant 33 for the purpose of adhering a first substrate 1 to a second substrate 21 and of preventing a contaminant for example moisture from interfusing with a liquid crystal layer 32, the outline edge sealant 93 has a large amount of spacer interfused therewith, since the outline edge sealant 93 is provided for stabilizing the thickness of the liquid crystal layer 32, as with an inter-color sealant 66, to thereby maintain a state of no irregular in the liquid crystal shutter function portion of the liquid crystal layer 32.

Alternatively, the sealant 33 may be made of a material having large thermal contraction tendency, high adhesiveness, and less osmosis of water, as with epoxy resin, and the inter-color sealant 66 and the outline edge sealant 93 may be made of a material having elasticity and less stress, as with acrylic resin. Otherwise, it is also possible to reduce occurrence of electrical shorts between a lot of wirings in the liquid crystal shutter function portion or between black matrixes and wirings, by interfusing conductive particles with the sealant 33 and electrically connecting counter electrodes and the black matrixes provided on the second substrate 21 and electrodes provided on the first substrate 1 to thereby cause reallocation, and by using a spacer made of an insulator for the inter-color sealant 66 and the outline edge sealant 93.

The structure of the lacing electrodes and the lead-out electrodes is essentially the same as described in the third embodiment using FIG. 12, provided that both of the lacing electrodes and the lead-out electrodes are made smaller in width in the facing portions of the lacing electrodes and the lead-out electrodes than the remaining portions. Specifically, as shown in FIG. 15, the lacing electrode is provided with small width portions 54, and the lead-out electrode is also provided with small width portions 92.

This makes it possible to reduce the facing areas of the lacing electrodes and the lead-out electrodes more than those in the third embodiment so that it is possible to lower influence of the voltage changes at the lead-out electrodes on the transmittance of the other pixels.

Figure 16:
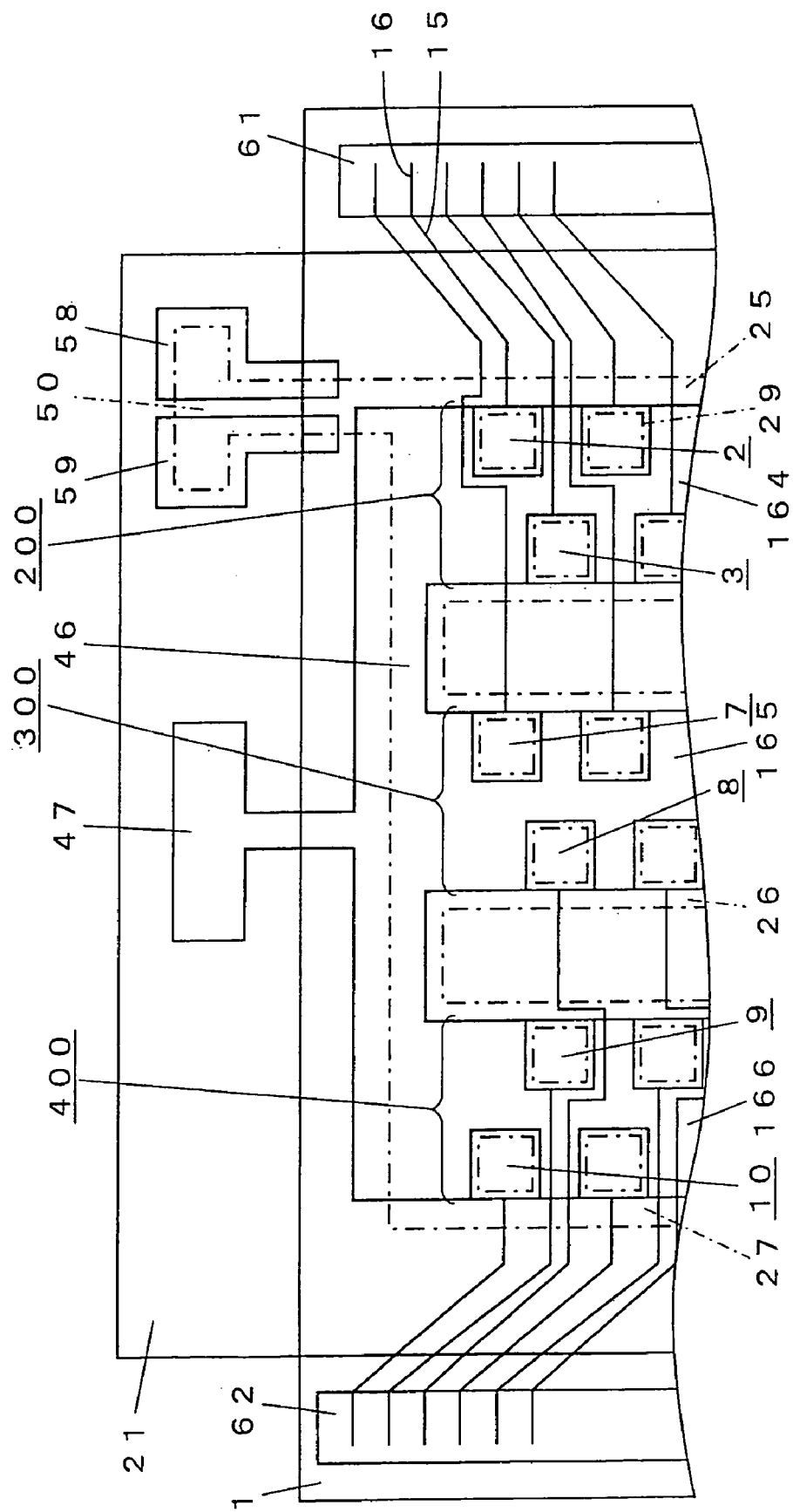
FIG. 16 is a partial plan view corresponding to FIG. 8 for illustrating an arrangement of electrodes and light shield films in a liquid crystal shutter device according to a fifth embodiment of the invention.

Fifth Embodiment: FIG. 16

Subsequently, a fifth embodiment of the liquid crystal shutter device of the invention will be described. FIG. 16 is a partial plan view corresponding to FIG. 8 for illustrating an arrangement of electrodes and light shield films in the liquid crystal shutter device. This liquid crystal shutter device differs from the liquid crystal shutter device of the second embodiment in regard only to the structure of counter electrodes, so that the description will be provided only in this regard.

In this liquid crystal shutter device, the counter electrodes are provided in a band-shape separately for each pixel row. Specifically, there are provided an R counter electrode 164, a G counter electrode 165, and a B counter electrode 166 corresponding respectively to an R row, a G row, and a B row. These counter electrodes are electrically connected with each other via an RGB coupling electrode 46 outside the liquid crystal shutter function unit. At the same time, there is provided an RGB pad electrode 47 in a sealant 33 so that it is possible to apply electronic signals to respective lacing electrodes therefrom.

In this structure, the facing areas of the lead-out electrodes and the counter electrodes become larger than those of the first to fourth embodiments mentioned before, nevertheless, it is possible to obtain quite large effectiveness of lowering influence of voltage changes at the lead-out electrodes on the transmittance of the other pixels as compared to the conventional device with the counter electrodes provided all over the surface.

Figure 17:
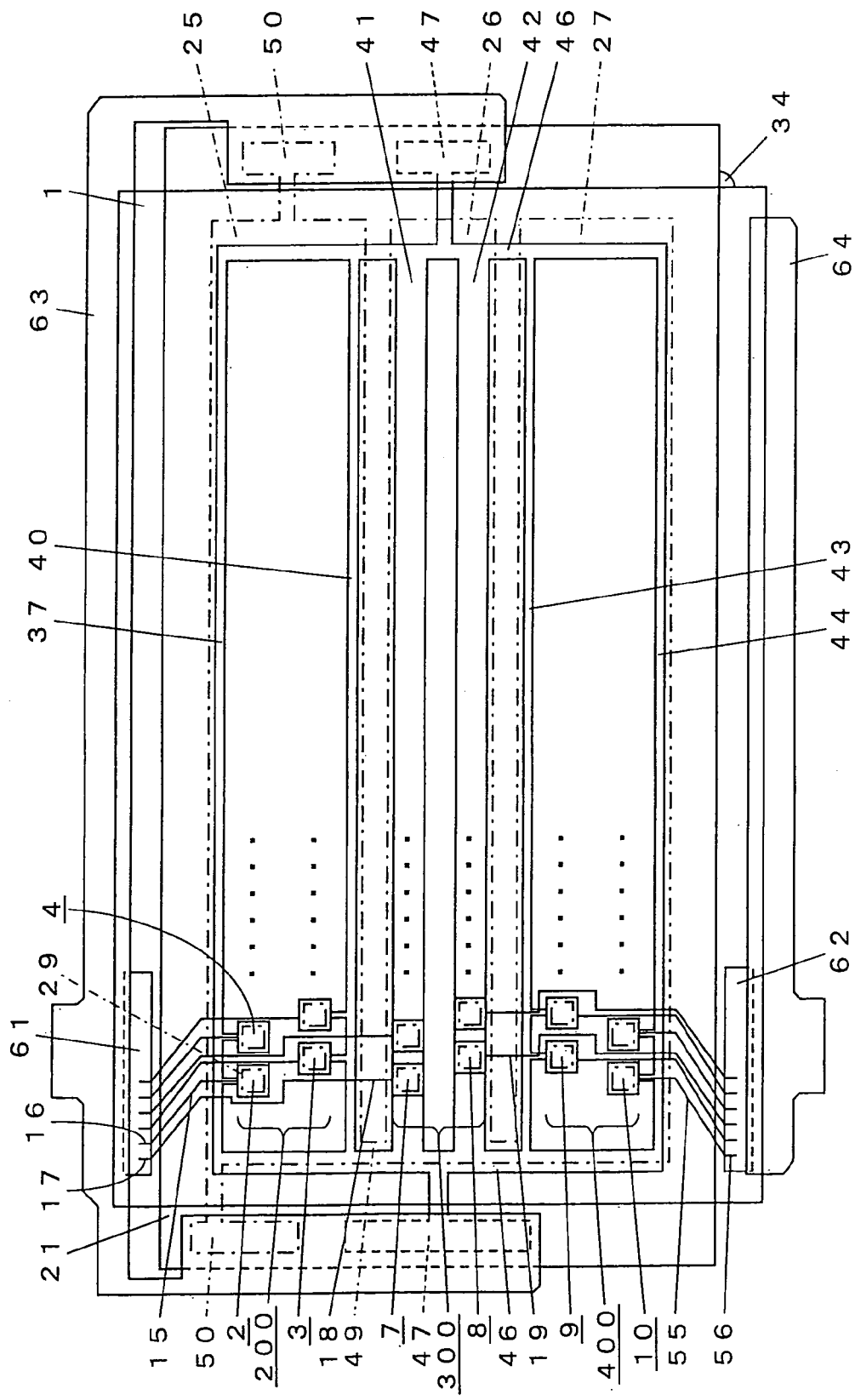
FIG. 17 is a plan view corresponding to FIG. 1 for illustrating an arrangement of electrodes and light shield films in the liquid crystal shutter device according to a sixth embodiment of the invention.
Figure 18:
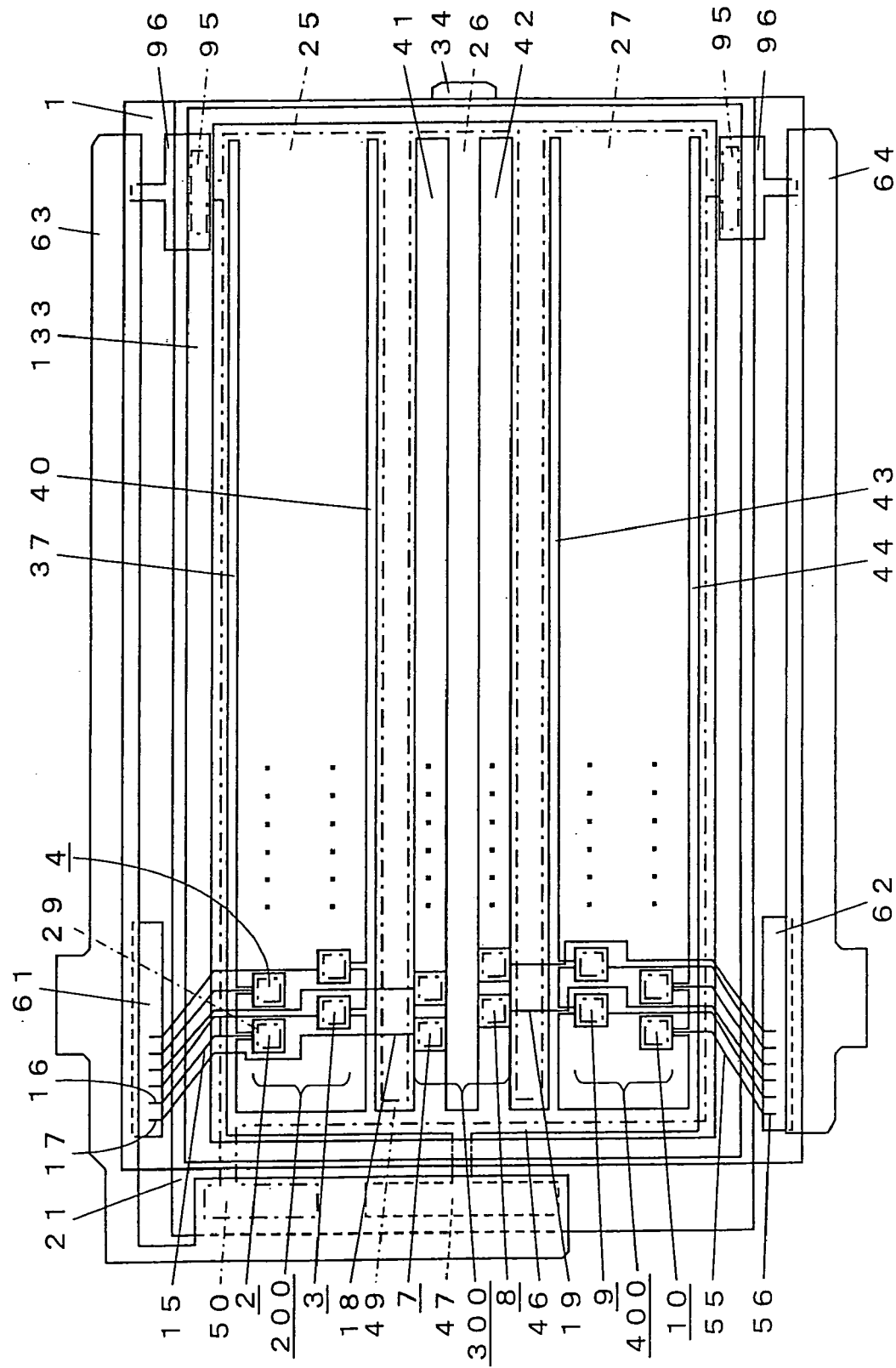
FIG. 18 is a plan view corresponding to FIG. 1 for illustrating an arrangement of electrodes and light shield films in a modification example thereof.
Figure 19:
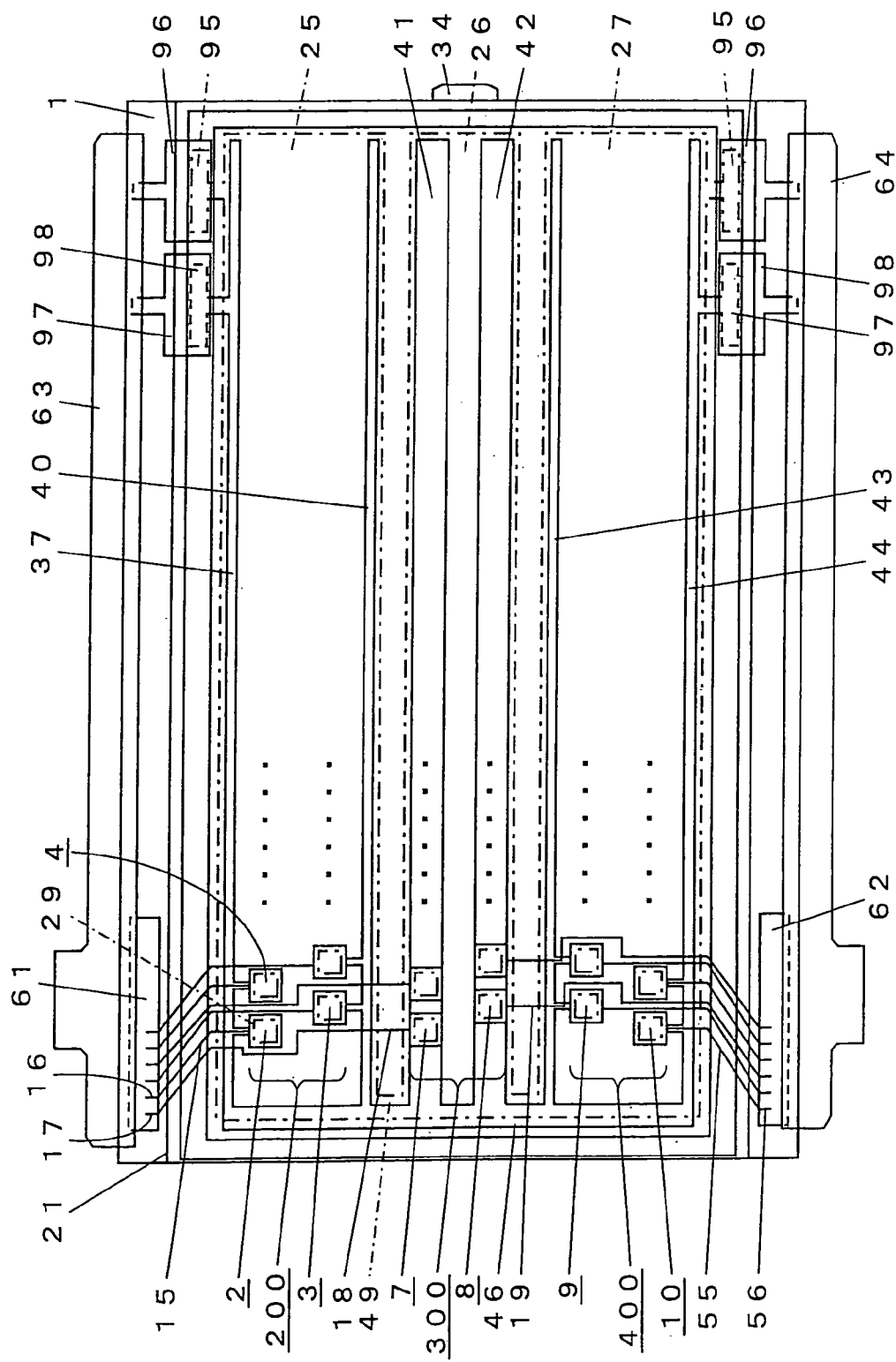
FIG. 19 is a plan view corresponding to FIG. 1 for illustrating an arrangement of electrodes and light shield films in another modification example thereof.

Sixth Embodiment and its Modification Examples: FIG. 17 to FIG. 19

Subsequently, a sixth embodiment of the liquid crystal shutter device of the invention and its modification examples will be described. FIG. 17 is a plan view corresponding to FIG. 1 for illustrating an arrangement of electrodes and light shield films in the liquid crystal shutter device, and FIG. 18 and FIG. 19 are plan views corresponding to FIG. 1 for illustrating the arrangements of the electrodes and the light shield films for respective modification examples. In these drawings, for portions corresponding to the structure described in the first embodiment, the same reference numerals are used. In addition, a sealant is shown in FIG. 18 and FIG. 19.

These liquid crystal shutter devices differ from the liquid crystal shutter device of the first embodiment in regard only to the arrangement of the electrodes for connecting black matrixes and counter electrodes with FPCs, and the structure of the portions related thereto, so that the description will be provided only in this regard.

In the liquid crystal shutter device of the embodiment, first, a second substrate 21 projects from a first substrate 1 also on the right side of the drawing and, in the projecting portion, a BM pad electrode 50 is also provided in the right-side projecting portion, the BM pad electrode 50 being connected with an R black matrix 25. Incidentally, on the right side of the drawing, no BM coupling portion 49 is provided. For the counter electrodes, an RGB pad electrode 47 is also provided on the right side of the drawing. Moreover, there is also provided an RGB coupling electrode 46 on the right side of the drawing outside the liquid crystal shutter function unit to thereby connect each of the lacing electrodes.

Accordingly, in this liquid crystal shutter device, it is possible to apply electronic signals to the black matrixes and the counter electrodes respectively via the BM pad electrodes 50 and the RGB pad electrodes 47 from the both left and right sides in the drawing. Then, in order to apply signals from such the both sides, a first FPC 63 is formed to have a different shape from that of the first embodiment so that it is connected also with the BM pad electrodes 50 and the RGB pad electrodes 47 on both sides in addition to a first driving IC 61, whereby provided with no third FPC.

Additionally, since it is unable to provide a filling hole of liquid crystal at the same position as of the first embodiment, the filling hole is provided at the lower right corner of the overlapped portion of the first substrate 1 and the second substrate 21 and is closed by a closing member 34.

In this liquid crystal shutter device, feeding to the black matrixes and the counter electrodes is carried out from both the sides as mentioned before, so that it is possible to prevent voltage drop caused by resistance of the black matrixes and the counter electrodes and, delay in applied waveform caused by capacitance of liquid crystal, allowing to obtain effective voltages extremely close to the applied signals at respective pixel portions and those portions facing the lead-out electrodes.

Besides, this is extremely convenient when employing such a connecting structure as described in the second embodiment in the BM pad electrodes 50, since an electrical conductive portion 70 can be formed by fusing a thin insulating film 23 by applying pulse voltages via the first FPC 63 connected with the BM pad electrodes 50 provided on the right and left sides.

Other than the above-mentioned structures, the black matrixes and the counter electrodes may be structured to connect with FPCs as shown in FIG. 18.

In the modification example shown in the drawing, a sealant 133 is an anisotropic conductive sealant (ACS) mixed with conductive particles. In the upper right portion and the lower right portion in the drawing, there are provided BM electrodes for ACS 95 for connecting the black matrixes with the FPCs, in the overlapped portions with the sealant 133, and there are provided BM electrodes for ACS 96 formed of a transparent conductive film on the first substrate 1 in the positions facing the BM electrodes for ACS 95. With the conductive particles in the sealant 133, the BM electrodes for ACS 95 on the second substrate 21 and the BM electrodes for ACS 96 on the first substrate 1 are connected. Besides, the BM electrodes for ACS 96 are connected on the first substrate 1 with a first FPC 63 or a second FPC 64 to thereby electrically connect the black matrixes with the FPCs also on the right side of the drawing.

Incidentally, a BM pad electrode 50 and an RGB pad electrode 47 on the left side of the drawing are provided in the same manner as in the first embodiment, and the counter electrodes are connected with the FPCs only via the RGB pad electrode 47.

According to this structure, the required portion of the second substrate 21 projecting from the first substrate 1 is only of one side, allowing to reduce the size of the liquid crystal shutter device. Also, it is possible to reduce the size of the FPCs to thereby facilitate pressure bonding process for the FPCs. Also in this structure, it is also possible to apply voltages to the black matrixes from a plurality of places, so that, as for the black matrixes, the same effect as in the structure shown in FIG. 17 can be obtained. Particularly, when the BM pad electrode 50 employs the same connecting structure as described in the second embodiment, it is possible to form the electrical conductive portion 70 easily by applying pulse voltages via electrodes at plural positions, being extremely convenient.

Further, the black matrixes and the counter electrodes may be connected with the FPCs as shown in FIG. 19.

In the modification example shown in the drawing, in addition to the BM electrodes for ACS 95, there are provided counter electrodes for ACS 97 for connecting the counter electrodes with the FPCs, in the overlapped portions of an ACS with the sealant 133 and in the upper and lower right portions in the drawing, and in addition to the BM electrodes for ACS 96, there are provided counter electrode connecting electrodes for ACS 98 formed of a transparent conductive film in those positions facing the counter electrodes for ACS 97 on the first substrate 1. With the conductive particles in the sealant 133, the counter electrodes for ACS 97 on the second substrate 21 and the counter electrode connecting electrodes for ACS 98 on the first substrate 1 are connected. Further, the counter electrode connecting electrodes for ACS 98 is connected with the first FPC 63 or the second FPC 64 on the first substrate 1 to thereby electrically connect the counter electrodes and the FPCs also at the upper and lower sides in the drawing.

Incidentally, in this liquid crystal shutter device, there is provided no BM pad electrode 50 and RGB pad electrode 47, whereby provided no projecting portion of the second substrate 21 from the first substrate 1.

According to this structure, the second substrate 21 has no projecting portion from the first substrate 1, so that the size of the liquid crystal shutter device can be made still smaller than that shown in FIG. 18. Also, the size of the FPCs can be reduced to thereby facilitate the pressure bonding process for the FPCs. Also, in this structure, it is still possible to apply voltages from a plurality of places to the black matrixes and the counter electrodes, so that the same effect as in the structure shown in FIG. 17 can be obtained.

Particularly, when the black matrixes are provided with the thin insulating film 23 thereon, it is possible to form the electrical conductive portion 70 by easily fusing the thin insulating film 23 by applying pulse voltages via the FPCs connecting with the two BM electrodes for ACS 96, being extremely convenient. Even when there is a large connection resistance between the counter electrodes and the FPCs, and/or at the ACS portion, it is still possible to lower the connection resistance by applying the pulse voltages via the FPCs, whereby the resistance portion is electrically broken down.

Figure 20:
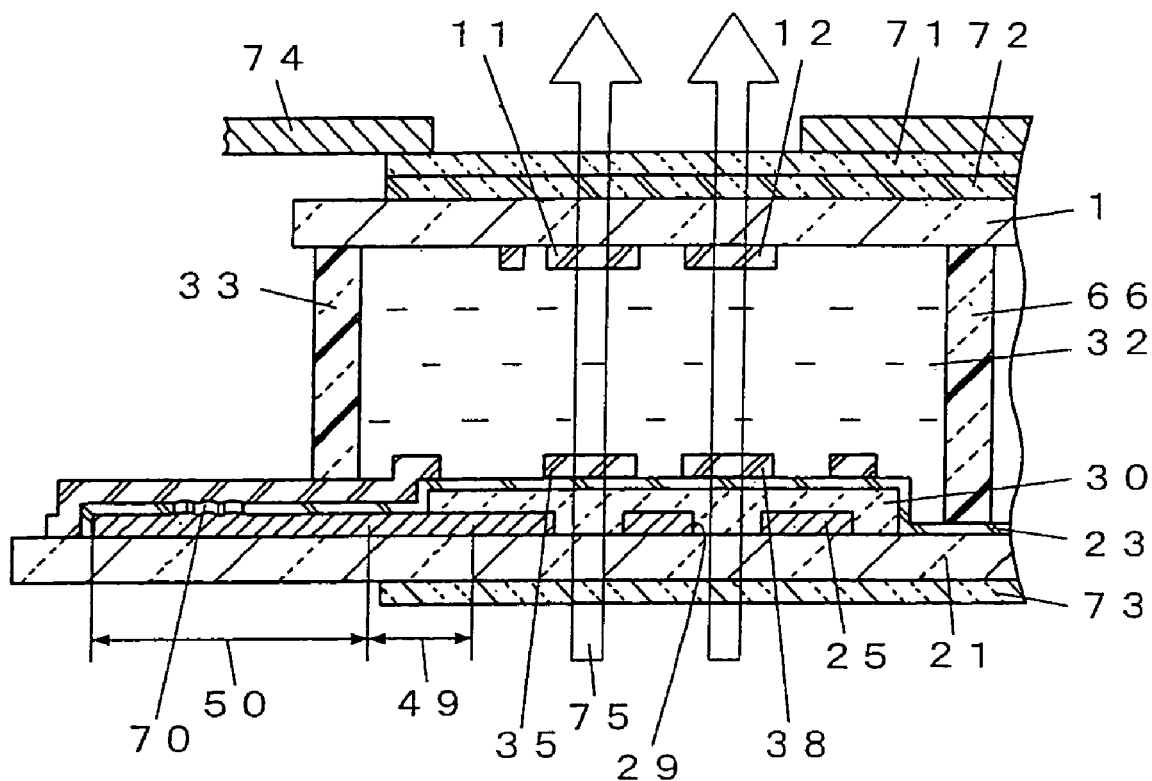
FIG. 20 is a partial sectional view corresponding to FIG. 13 showing a part of the section of a liquid crystal shutter device according to a seventh embodiment of the invention.

Seventh Embodiment: FIG. 20

Subsequently, a seventh embodiment of the liquid crystal shutter device of the invention will be described. FIG. 20 is a partial sectional view corresponding to FIG. 13 for showing a part of the section of the liquid crystal shutter device. Incidentally, in the drawing, FPCs connected with the liquid crystal shutter device are omitted to illustrate, and for portions corresponding to the first to third embodiments, the same reference numerals are used. Additionally, this liquid crystal shutter device differs from the liquid crystal shutter device of the third embodiment in regard only to an external light shield member 74 provided therein, so that the description will be provided only in this regard.

In this liquid crystal shutter device, there is provided the external light shield member 74 on a first polarizer 71 on a side of a first substrate 1 opposite to a liquid crystal layer 32 in a manner partially overlapped with a black matrix. This external light shield member 74 is provided for preventing a black matrix space 31 having no black matrix from receiving reflected light stream for example by a lens or the like, when the liquid crystal shutter device is used as a liquid crystal shutter of an optical printer. The external light shield member 74 therefore has a larger opening than the BM opening 29 corresponding to each of the pixels, so as not to cover the BM opening 29. Here, one opening is provided for each row so as to include all the pixels of the row. In addition, the external light shield member 74 is of a thin type and coats surface of itself with frost black paint to thereby prevent reflection on its surface.

Although the black matrix has sufficient effect to prevent a light from a light source by itself, this external light shield member 74 obtains further capability of preventing extra reflection light and the like coming from other than the light source, allowing a photosensitive paper 101 to prevent itself from receiving the reflected light not passing through the pixel, so that it is possible to improve quality of image formed when using the liquid crystal shutter device in the optical printer.

Incidentally, the external light shield member 74 may be provided on a side of a second substrate 21 opposite to the liquid crystal side as well as on both of the first substrate 1 and the second substrate 21.

Figure 21:
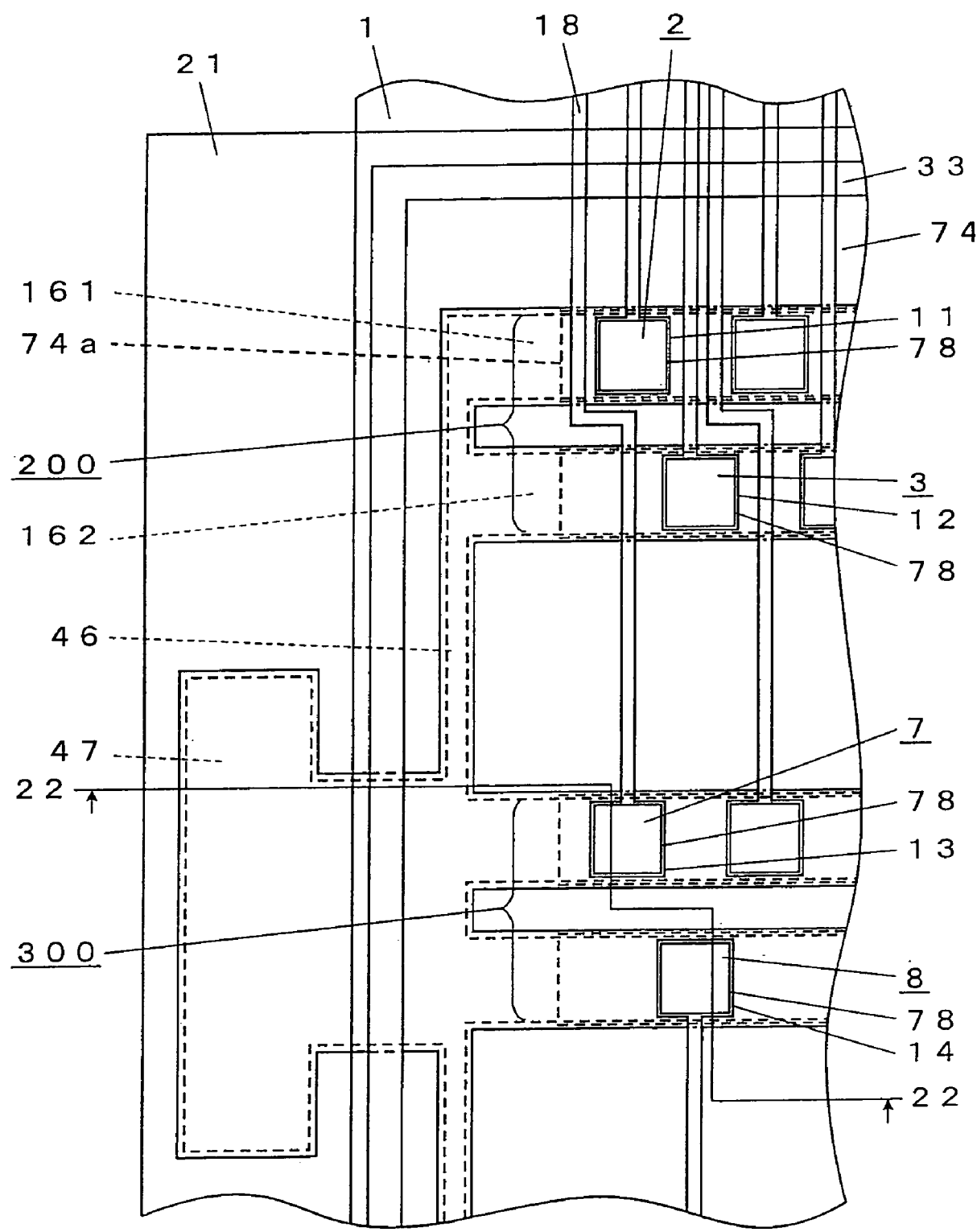
FIG. 21 is a partial plan view corresponding to FIG. 9 showing a configuration of a liquid crystal shutter device according to a eighth embodiment of the invention.
Figure 22:
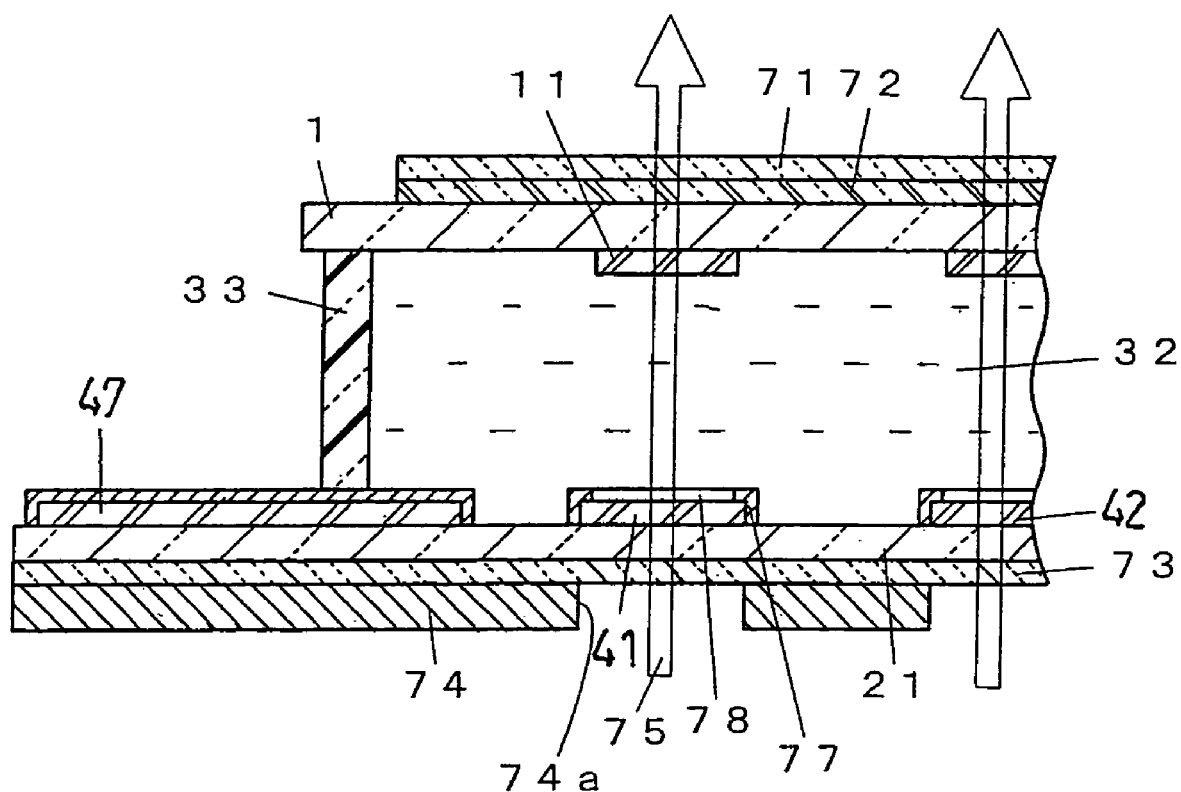
FIG. 22 is a partial sectional view taken along a part of line 22—22 in FIG. 21.

Eighth Embodiment: FIG. 21 and FIG. 22

Subsequently, an eighth embodiment of the liquid crystal shutter device of the invention will be described. FIG. 21 is a partial plan view corresponding to FIG. 9 showing a structure of the liquid crystal shutter device, and FIG. 22 is a partial sectional view showing a part of the section taken along line 22—22 in FIG. 21. In these drawings, FPCs connected with the liquid crystal shutter device are omitted to illustrate, and for portions corresponding to the first and second embodiments, the same reference numerals are used. Additionally, the liquid crystal shutter device of the embodiment is characterized by having a plated layer 77 and an external light shield member 74 to realize a light shield function without having any black matrix, so that the description will be provided primarily in this regard and for differences from the liquid crystal shutter device of the first embodiment.

First, in this liquid crystal shutter device, differently from the first embodiment, there is provided no black matrix including R, G, B black matrixes 25, 26 and 27, a BM coupling portion 49, and the like. Besides, a counter electrode has a band-shape and separately provided for each line of respective pixel rows. Specifically, for example, for an R pixel row 200, there are provided an R1 counter electrode 161 for the first line pixels, and an R2 counter electrode 162 for the second line pixels. For a G pixel row 300 and a B pixel row 400, the counter electrodes are provided in the same manner. In total, six band-shaped counter electrodes are provided, and are electrically connected via an RGB coupling electrode 46. Additionally, an RGB pad electrode 47 is provided outside a sealant 33, so that it is allowed to apply electric signals to respective lacing electrodes therefrom.

On the counter electrodes including the RGB coupling electrode 46 and the RGB pad electrode 47, there is provided the plated layer 77 of a metal plating. Preferably, this plated layer 77 can be formed of, for example, gold or nickel. For a portion facing each pixel electrode and corresponding to each pixel, there is provided no plated layer 77 and is formed to be a plated layer opening 78.

Also, as shown in FIG. 22, for a second substrate 21, a thin glass of 0.3 mm in thickness is used, and on the opposite side surface of the second substrate 21 to a liquid crystal layer 32, the external light shield member 74 is provided. The reason why external light shield member 74 is additionally provided is that the plated layer 77 cannot have enough width in a direction orthogonal to the pixel row since it is provided on the counter electrode so that it is impossible to have enough effect independently to shield against the light detouring therearound from the direction orthogonal to the pixel row. Accordingly, the external light shield member 74 is provided with the openings 74a at portions corresponding to the respective pixel lines of the pixel rows and is structured to cover all over the second substrate 21 except the portions of the openings 74a.

In this structure, it is possible to shield periphery of the pixels against light by the external light shield member 74 and the plated layer 77, eliminating the need of the black matrix. It is also possible for the plated layer 77 to reduce the resistance value of the counter electrodes to thereby lower the influence of the voltage changes at the lead-out electrodes on the voltages to be applied to the liquid crystal layer 32 at the pixel portions via capacitance of the liquid crystal layer 32 and the counter electrodes, so that the influence of the voltage changes on the transmittances of the pixel portions can be lowered.

Figure 23:
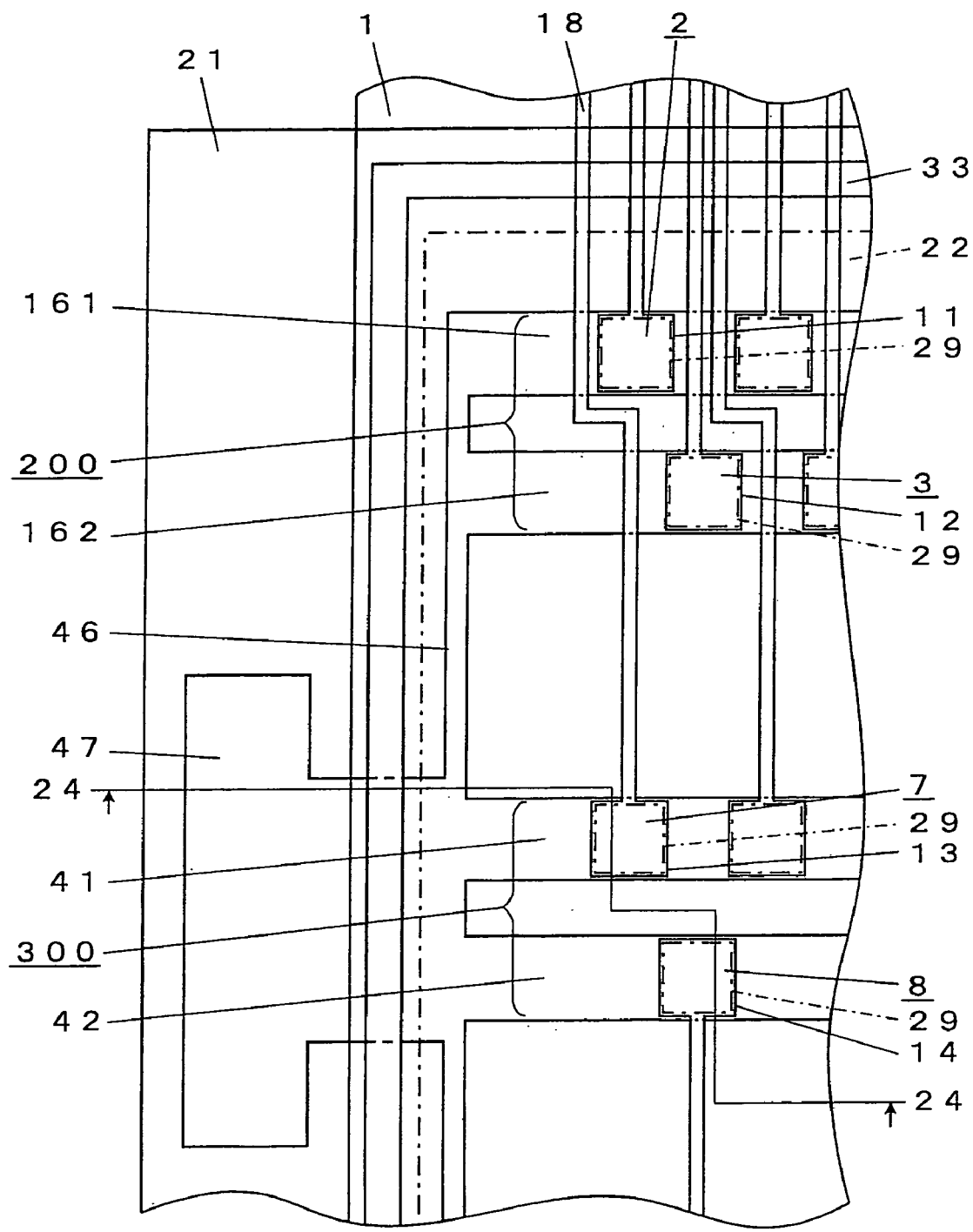
FIG. 23 is a partial plan view corresponding to FIG. 9 showing a configuration of a liquid crystal shutter device according to a ninth embodiment of the invention.
Figure 24:
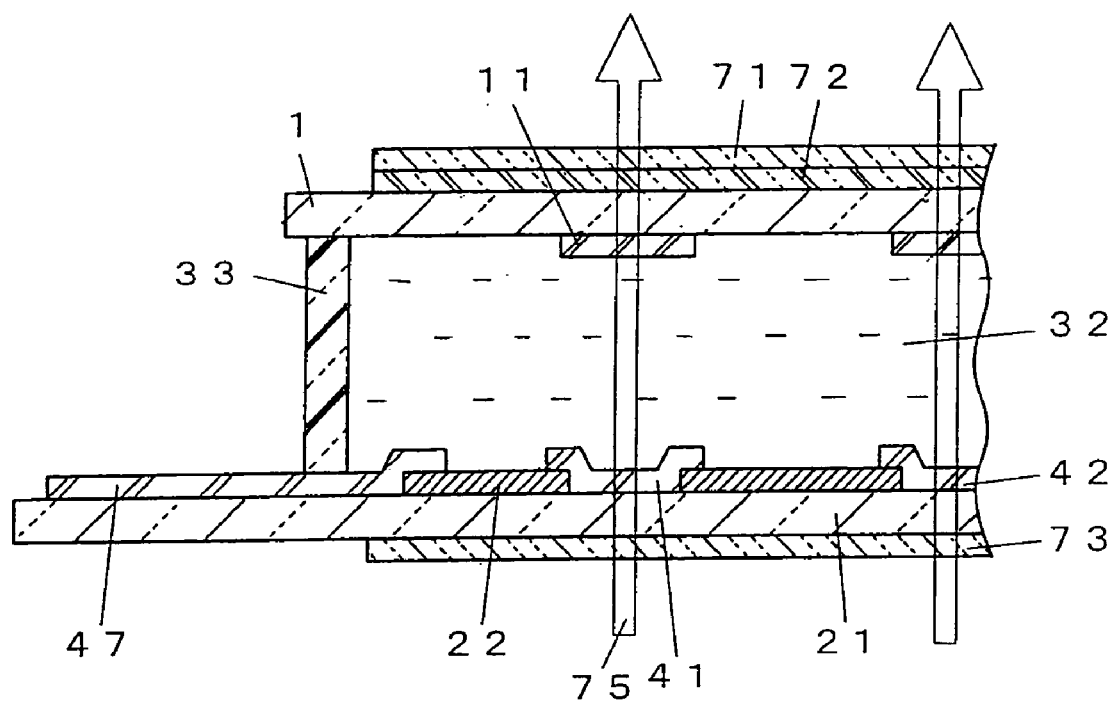
FIG. 24 is a partial sectional view taken along a part of line 24—24 in FIG. 23.

Ninth Embodiment: FIG. 23 and FIG. 24

Subsequently, a ninth embodiment of the liquid crystal shutter device of the invention will be described. FIG. 23 is a partial plan view corresponding to FIG. 9 showing a structure of the liquid crystal shutter device, and FIG. 24 is a partial sectional view showing a part of section taken along line 24—24 in FIG. 23. In these drawings, FPCs connected with the liquid crystal shutter device is omitted to illustrate, and for portions corresponding to the structure of the first and second embodiments, the same reference numerals are used. Additionally, the liquid crystal shutter device of the embodiment is characterized in that a black matrix is made of an insulating material, and accordingly the description will be provided primarily in this regard and for differences from the liquid crystal shutter device of the first embodiment.

First, in this liquid crystal shutter device, as a light shield film, there is provided an insulating black matrix 22 made of resin mixed with black pigment or the like almost all over the portion surrounded by the sealant 33 on the liquid crystal layer 32 side of the second substrate 21, provided that portions facing respective pixel electrodes and corresponding to pixels are BM openings 29 having no insulating black matrix 22. Also, no BM pad electrode 50 is provided for the insulating black matrix 22 since the same requires no voltage application.

Further, on the insulating black matrix 22, counter electrodes are directly provided without having any insulating film 30 therebetween. The counter electrodes are of a band-shaped and independently provided for each pixel line of respective pixel rows as in the case of the eighth embodiment.

As with this liquid crystal shutter device, when the insulating black matrix 22 is used as the light shield film, no capacity coupling via the liquid crystal layer 32 occurs for the facing portions of the lead-out electrodes and the light shield films, affecting a display little even though the areas of the light shield film are increased.

Incidentally, since there is no need to insulate the counter electrode from the insulating black matrix 22, no insulating film 30 is provided here, however, for the purpose of flattening the steps of the insulating black matrix 22, a flattening insulating film may be provided on the insulating black matrix 22 to provide the counter electrode thereon.

Figure 25:
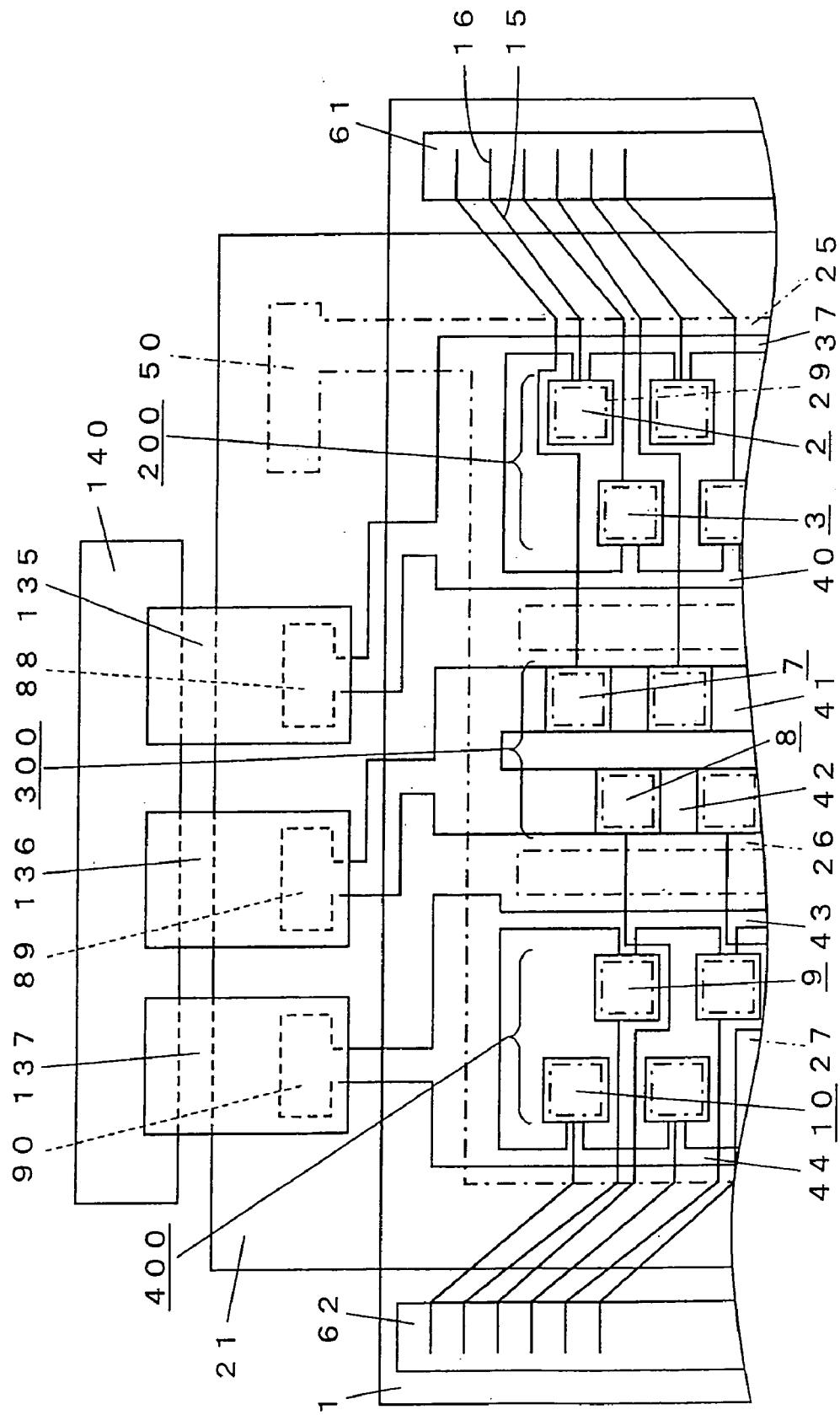
FIG. 25 is a partial plan view corresponding to FIG. 8 showing a configuration of the liquid crystal shutter device according to the first embodiment of the invention where a first modification example is applied.
Figure 26:
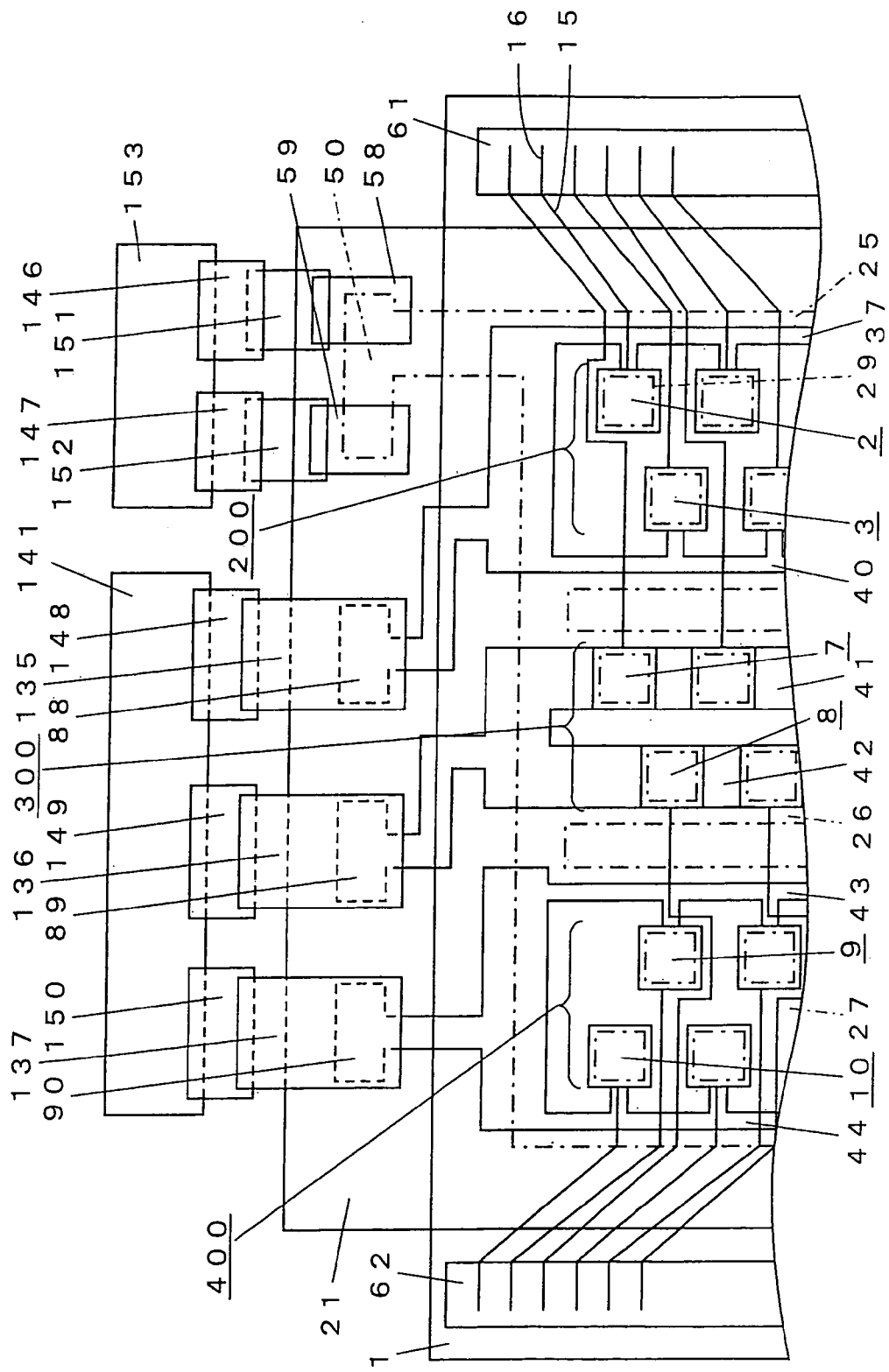
FIG. 26 is a partial plan view showing a configuration of the same where a second modification example is applied.
Figure 27:
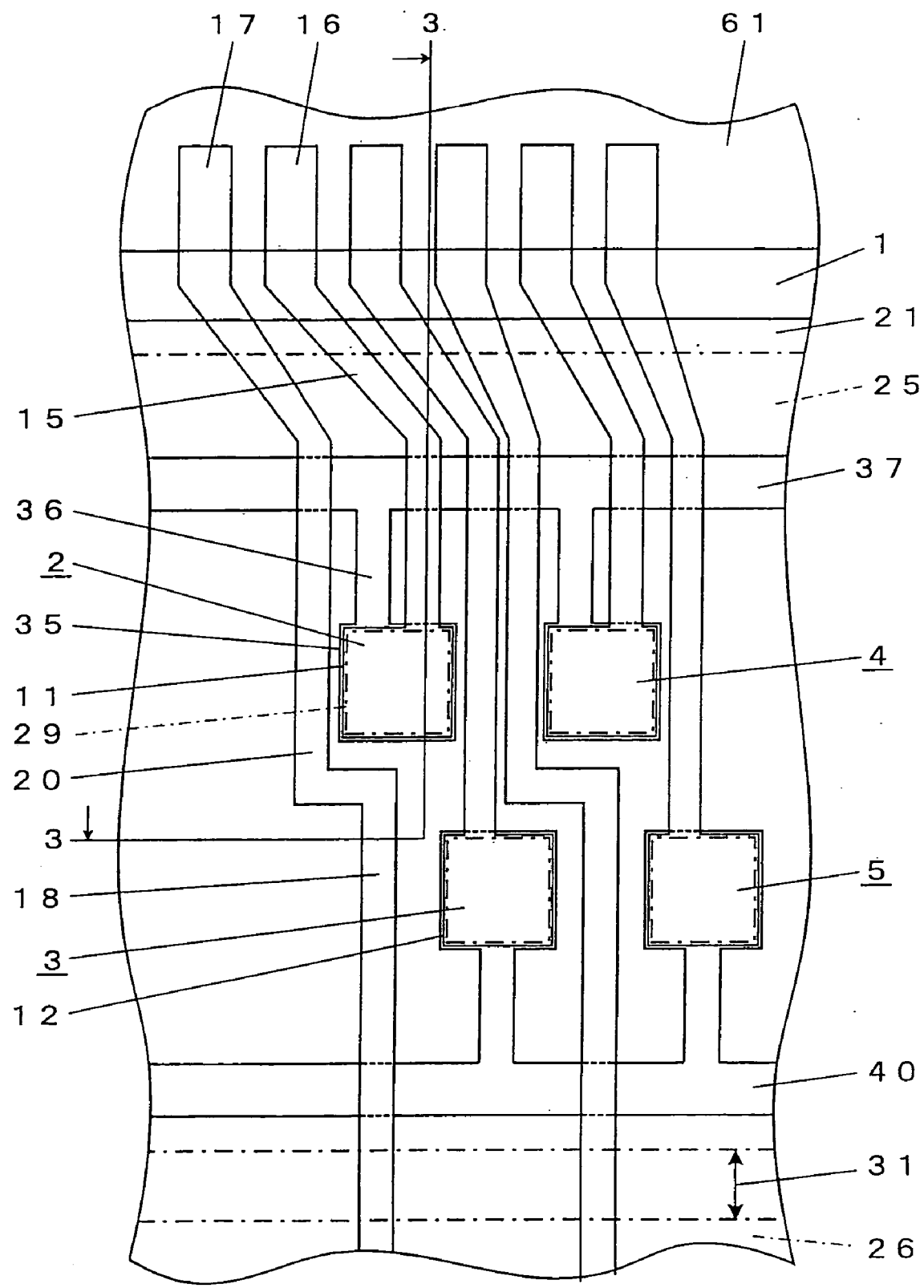
FIG. 27 is a partial plan view corresponding to FIG. 2 showing a configuration of the same where a third modification example is applied.

Modification Examples of Respective Embodiments: FIG. 25 to FIG. 27

Subsequently, modification examples of the above-described embodiments will be described. FIG. 25 is a partial plan view corresponding to FIG. 8 showing a structure of the liquid crystal shutter device of the first embodiment adopting a first modification example, FIG. 26 is a similar partial plan view showing a configuration of the same adopting a second modification example, and FIG. 27 is a partial plan view corresponding to FIG. 2 showing a configuration of the same adopting a third modification example. In these drawings, for portion corresponding to the structure described in the first embodiment, the same reference numerals are used. Incidentally, the description will be provided for those modification examples when adopted in the first embodiment as an example here, whereas, they may surely be adopted in the other embodiments.

First, in the first modification example, without providing an RGB coupling electrode 46 for connecting lacing electrodes corresponding to respective pixel rows, there are provided an R pad electrode 88, a G pad electrode 89, and a B pad electrode 90 for each R, G, B pixel row, together with an R signal connecting portion 135, a G signal connecting portion 136, and a B signal connecting portion 137 respectively connecting therewith to thereby connect counter electrodes, which are composed of respective R, G, B lacing electrodes, the pixel counter electrodes and the like, with a common RGB independent signal control unit 140.

Then, driving signals are applied to the counter electrodes from the RGB independent signal control unit 140 via the signal connecting units 135, 136 and 137, respectively.

As described above, the counter electrodes for the respective pixel rows may be electrically connected via external unit such as the RGB independent signal control unit 140 or the like instead of providing the RGB coupling electrode 46 on a second substrate 21. This makes it also possible to obtain the same effect as of the first embodiment provided with the RGB coupling electrode 46. In this case, on the side of the liquid crystal shutter device, respective R, G, B pad electrodes 88, 89, 90 are the connector (connecting means) to electrically connect the counter electrodes. Similarly, a black matrix being a light shield film may have the same structure.

Secondly, in a second modification example, there are provided an R independent signal control unit 148, a G independent signal control unit 149, and a B independent signal control unit 150 which are connected with respective R, G and B signal connecting portion 135, 136 and 137, and whereby connected with an RGB signal control unit 141. The independent signal control units 148, 149 and 150 apply independent driving signals to the counter electrodes of the R, G, B pixel rows respectively in response to control signals from the RGB signal control unit 141. Therefore, the counter electrodes for respective pixel rows are not connected electrically. In this structure, a driving circuit is required for each pixel row, so that the structure is complicated, whereas, the effect of reducing the areas of facing portions of the counter electrodes and the lead-out electrodes can similarly be obtained also in this structure.

Additionally, in this modification example, there are provided a first signal connecting portion 151 and a second signal connecting portion 152 connected with first and second BM connecting electrodes 58, 59 respectively, and a first BM signal control unit 146 and a second BM signal control unit 147 further connected therewith, so that these are connected with a BM signal control unit 153 being a light shield film driving circuit, whereby driving signals are applied from the BM signal control unit 153 to a BM pad electrode 50 and black matrixes therethrough. The first and second BM signal control units 146, 147 are used to apply voltages to a thin insulating film 23 to cause dielectric breakdown to thereby form an electrical conductive portion 70 between the first and second BM connecting electrodes 58 and 59, and the BM pad electrode 50.

As described above, a circuit for applying driving signals to the black matrixes and a circuit for applying voltages to cause dielectric breakdown may be provided separately.

Subsequently, in a third modification example, lead-out electrodes connected with respective pixel electrodes and take-out electrodes connected with respective pixel counter electrodes are arranged not to face each other.

In the examples shown in FIG. 2 and so on, for instance, an R1a lead-out electrode 15 connected with an R1a pixel electrode 11 and an R1a take-out electrode 36 connected with an R1a pixel counter electrode 35 are arranged so as to face each other. Preferably, however, the lead-out electrode and the take-out electrode are arranged not to face each other as shown in FIG. 27 from a viewpoint of reducing the facing areas of the lead-out electrode and the counter electrode, since the take-out electrode is also a part of the counter electrode.

Practically, it is presumable that such an arrangement space as in FIG. 27 cannot be obtained for displacing the lead-out electrodes and the take-out electrodes, which face each other in FIG. 2, not to face each other, because the lead-out electrodes and the take-out electrode each require a certain width to prevent the problems of resistance increase, disconnection, and the like, which are caused in case of an excessively small width, while in the case where the pixel is miniaturized, available wiring width comes to small. Still, even when the take-out electrodes and the lead-out electrodes have been arranged not to face each other, these may overlap each other due to a problem of accuracy in positioning a first substrate 1 and the second substrate 21.

In view of these considerations, in the previously-described embodiments, the electrodes are arranged as shown in FIG. 2, which brings about sufficient effect of the invention. In practice, however, the arrangement as shown in FIG. 27 is ideal. Accordingly, when employing the arrangement shown in FIG. 27, it is preferable that the take-out electrodes are formed not to overlap the lead-out electrodes led out from the other pixel row even if a kind of positioning difference is made. (For example, an R1a take-out electrode 36 of the R pixel row is arranged not to overlap a G1a lead-out electrode 18 led out from a G pixel row.)

Other than described in the above, in the liquid crystal shutter devices shown in respective embodiments, each of the R, G, B pixel rows is aligned in two lines, yet, the same effect according to the invention can be obtained even when each row is aligned in one line.

Also, in the above description, a retardation film 72 is provided on the upper surface of the first substrate 1, however, the same effect according to the invention can be obtained in the case where the retardation film 72 is provided on the second substrate 21, or on both of the first substrate 1 and the second substrate 21. Further, the invention is applicable to a device provided with no retardation film.

Furthermore, respective characteristics of the above-described embodiments can be combined.

INDUSTRIAL APPLICABILITY

As has been described, according to the liquid crystal shutter device of the invention, counter electrodes are provided independently for each pixel row to thereby reduce the areas thereof, so that the areas of facing portions of lead-out electrodes and the counter electrodes can be reduced. This makes it possible to lower the influence of signals applied to pixel electrodes via the lead-out electrodes on transmittances of the other pixels via the counter electrodes, and to control the transmittance of each pixel to a desired value, so that light irradiation to a photosensitive member can be controlled appropriately. With the use of such a liquid crystal shutter device, it is possible to configure an optical printer capable of forming an image of high quality without irregular.

The invention claimed is:

1. A liquid crystal shutter device comprising:
   a liquid crystal cell comprising a first substrate, a second substrate and liquid crystal sandwiched therebetween;
   pixel electrodes, which are signal electrodes, and lead-out electrodes provided on said first substrate;
   counter electrodes, which are common electrodes facing said pixel electrodes, provided on said second substrate; and
   a plurality of pixel rows comprising pixels each formed by an overlapped portion of said pixel electrode and said counter electrode, each of said pixel rows corresponding to image formation of a different color, the liquid crystal shutter device controlling light irradiation to a photosensitive member continuously and relatively moving in a direction orthogonal to said pixel rows, wherein a light shield film is provided separately for each of said pixel rows and overlaps each of said pixel rows, and wherein openings in said light shield film are provided at portions corresponding to said pixels.

2. The liquid crystal shutter device according to claim 1, wherein said counter electrodes comprise pixel counter electrodes each corresponding to each of said pixel electrode and common connecting electrodes for electrically connecting said pixel counter electrodes.

3. The liquid crystal shutter device according to claim 2, wherein said common connecting electrodes comprise lacing electrodes provided alongside said pixel rows and take-out electrodes for connecting said pixel counter electrodes and said lacing electrodes.

4. The liquid crystal shutter device according to claim 3, wherein, in an overlapped portion of said lead-out electrode and said lacing electrode, either of said lead-out electrode or said lacing electrode is made small in line width as compared to the remaining portions thereof.

5. The liquid crystal shutter device according to claim 2, wherein said pixel counter electrode is formed in an almost same shape as of said pixel electrode.

6. The liquid crystal shutter device according to claim 1, wherein pixels composing said pixel rows are aligned in two lines for each pixel row at same pitches as of a pixel size in an aligning direction, the pixels of one of the two lines and the pixels of the other line being arranged at positions misaligning by one pixel size in respective aligning directions.

7. The liquid crystal shutter device according to claim 6, wherein said common connecting electrode comprises a lacing electrode provided alongside said pixel rows and a take-out electrode for connecting said pixel counter electrodes and said lacing electrodes, and wherein said lacing electrodes are provided on both sides of said pixel counter electrodes aligned in two lines and said take-out electrodes taken out from said pixel counter electrodes aligned in two lines are connected with said lacing electrode on corresponding side, respectively.

8. The liquid crystal shutter device according to claim 6, wherein said common connecting electrode comprises a lacing electrode provided alongside said pixel rows and a take-out electrode for connecting said pixel counter electrodes and said lacing electrodes, and wherein said lacing electrodes are provided on one side of the pixel counter electrodes aligned in two lines, and said take-out electrodes connect in common respective pair of pixel counter electrodes composing said pixel counter electrodes aligned in two lines and also connect said pair of pixel counter electrodes with said lacing electrodes.

9. The liquid crystal shutter device according to claim 1, wherein said pixels composing said pixel rows are aligned in two lines for each pixel row at same pitches as of a pixel size in an aligning direction, the pixels of one of the two lines and the pixels of the other line being arranged at positions misaligning with each other by one pixel size in respective aligning directions, and wherein each of said counter electrodes is provided in an one-band shape for said pixel electrodes composing said pixels aligned in two lines.

10. The liquid crystal shutter device according to claim 1, wherein said pixels composing said pixel rows are aligned in two lines for each pixel row at same pitches as of a pixel size in an aligning direction, the pixels of one of the two lines and the pixels of the other line being arranged at positions misaligning with each other by one pixel size in respective aligning directions, and wherein each of said counter electrodes are provided in a band shape for said pixel electrodes composing the pixels aligned in two lines, separately for each line.

11. The liquid crystal shutter device according to claim 1, wherein three pixel rows are provided as said plurality of pixel rows.

12. The liquid crystal shutter device according to claim 11, wherein the three pixel rows are pixel rows corresponding to respective colors of red (R), green (G), and blue (B).

13. The liquid crystal shutter device according to claim 11, wherein, in outside two pixel rows out of the three pixel rows, said counter electrode is comprised of pixel counter electrodes each corresponding to each of said pixel electrodes and common connecting electrodes for electrically connecting said pixel counter electrodes, and in a center pixel row, said counter electrode is formed in a band shape so as to face said pixel electrodes of corresponding pixel row.

14. The liquid crystal shutter device according to claim 1, further comprising a metal-plated layer for portions of said counter electrodes except those portions facing said pixel electrodes.

15. The liquid crystal shutter device according to claim 1, further comprising a light shield film connector for electrically connecting said light shield films separately provided for each of said pixel rows.

16. The liquid crystal shutter device according to claim 1, further comprising a pad electrode provided on said second substrate for supplying said light shield films with electric signals.

17. The liquid crystal shutter device according to claim 16, wherein comprising a connecting electrode facing said pad electrode via the insulating film is provided on said second substrate.

18. The liquid crystal shutter device according to claim 17, wherein a conductive area is formed in the insulating film between said pad electrode and said connecting electrode.

19. The liquid crystal shutter device according to claim 18, further comprising a light shield film driving circuit for supplying said connecting electrode with a light shield film driving signal.

20. The liquid crystal shutter device according to claim 19, wherein said light shield film driving circuit is a circuit for supplying said pad electrode with the light shield film driving signal from said connecting electrode via the conductive area.

21. The liquid crystal shutter device according to claim 20, wherein the light shield film driving signal is a signal having a medium voltage of a voltage range being applied to said liquid crystal by said pixel electrodes and said counter electrodes.

22. The liquid crystal shutter device according to claim 17, further comprising a light shield film driving circuit for supplying said connecting electrode with a light shield film driving signal, wherein said light shield film driving circuit is a circuit for supplying said pad electrode with an AC light shield film driving signal from said connecting electrode via the insulating film.

23. The liquid crystal shutter device according to claim 22, wherein the light shield film driving signal is a signal a center voltage of which is a medium voltage of the voltage range being applied to said liquid crystal by said pixel electrodes and said counter electrodes.

24. The liquid crystal shutter device according to claim 1, further comprising an external light shield member provided on a side of said first substrate or said second substrate opposite to said liquid crystal.

25. The liquid crystal shutter device according to claim 1, wherein said light shield film is a metallic light shield film and provided on said second substrate, with an insulating film between said counter electrodes and said light shield film.

26. The liquid crystal shutter device according to claim 25, wherein said counter electrodes are separately provided for each of said pixel rows.

27. The liquid crystal shutter device according to claim 26, further comprising a connector for electrically connecting said counter electrodes for each of said pixel rows.

28. The liquid crystal shutter device according to claim 27, wherein said connector is provided outside a liquid crystal shutter function portion in which said pixel rows are arranged.

* * * * *